US011528795B2

(12) United States Patent
Herf et al.

(10) Patent No.: US 11,528,795 B2
(45) Date of Patent: Dec. 13, 2022

(54) COORDINATED LIGHTING ADJUSTMENT FOR GROUPS

(71) Applicant: F.lux Software LLC, Los Angeles, CA (US)

(72) Inventors: Michael Herf, Los Angeles, CA (US); Lorna Herf, Los Angeles, CA (US)

(73) Assignee: F.lux Software LLC, Los Angeles, CA (US)

( * ) Notice: Subject to any disclaimer, the term of this patent is extended or adjusted under 35 U.S.C. 154(b) by 15 days.

(21) Appl. No.: 16/410,621

(22) Filed: May 13, 2019

(65) Prior Publication Data

US 2019/0350066 A1    Nov. 14, 2019

Related U.S. Application Data

(60) Provisional application No. 62/670,513, filed on May 11, 2018.

(51) Int. Cl.
*H05B 47/16* (2020.01)
*H05B 47/105* (2020.01)
*H05B 47/11* (2020.01)

(52) U.S. Cl.
CPC .......... *H05B 47/16* (2020.01); *H05B 47/105* (2020.01); *H05B 47/11* (2020.01)

(58) Field of Classification Search
None
See application file for complete search history.

(56) References Cited

U.S. PATENT DOCUMENTS

| 5,545,192 A | 8/1996 | Czeisler et al. |
| 5,874,988 A | 2/1999 | Gu |
| 6,600,833 B1 | 7/2003 | Tan et al. |

(Continued)

FOREIGN PATENT DOCUMENTS

| AU | 2020250226 A1 * | 11/2020 | ......... A61B 5/02055 |
| EP | 1619648 | 1/2006 | |

(Continued)

OTHER PUBLICATIONS

"Can color temperature affect my mood?" Westinghouse Lighting [online] retrieved on Mar. 28, 2016. Retrieved from the Internet: <URL: http://www.westinghouselighting.com/color-temperature.aspx>, 3 pages.

(Continued)

*Primary Examiner* — Srinivas Sathiraju
(74) *Attorney, Agent, or Firm* — Fish & Richardson P.C.

(57) ABSTRACT

A computer-implemented method of lighting control is disclosed. The method includes identifying a group of people according to a relationship between or among the people that indicates the people are likely to regularly reside in a common location, determining a goal for the group of people for aligning circadian cycles of people in the group of people, determining a time and manner for altering ambient light at the common location in a manner to achieve the determined goal; and generating control signals to cause ambient lighting appliances at the common location to alter their performance according to the determined time and manner to achieve the determined goal.

20 Claims, 6 Drawing Sheets

(56) References Cited

U.S. PATENT DOCUMENTS

| | | | |
|---|---|---|---|
| 6,734,873 B1* | 5/2004 | Herf | G06T 15/40 345/545 |
| 6,870,529 B1 | 3/2005 | Davis | |
| 6,925,210 B2* | 8/2005 | Herf | G06T 5/002 382/284 |
| 7,446,762 B2 | 11/2008 | Hsieh et al. | |
| 7,734,584 B1* | 6/2010 | McBarron | H04L 69/04 707/622 |
| 7,761,507 B2* | 7/2010 | Herf | H04L 12/1822 709/204 |
| 7,840,067 B2 | 11/2010 | Shen et al. | |
| 7,970,240 B1* | 6/2011 | Chao | G06F 7/08 382/307 |
| 8,188,990 B2 | 5/2012 | Zamorsky et al. | |
| 8,303,635 B2* | 11/2012 | Hurst | A61M 21/00 128/898 |
| 8,384,780 B1 | 2/2013 | Frank et al. | |
| 8,436,556 B2 | 5/2013 | Eisele et al. | |
| 8,648,691 B2 | 2/2014 | Zuo et al. | |
| 8,705,897 B1* | 4/2014 | Chao | G06F 16/54 382/307 |
| 9,039,199 B2 | 5/2015 | Asakawa | |
| 9,326,364 B2* | 4/2016 | Maeda | H05B 47/19 |
| 9,655,211 B2 | 5/2017 | Altamura et al. | |
| 9,681,519 B2* | 6/2017 | Smith | H05B 47/11 |
| 9,820,365 B2* | 11/2017 | Schlangen | A61M 21/02 |
| 9,955,551 B2* | 4/2018 | Spero | H05B 45/20 |
| 10,013,861 B2* | 7/2018 | Fadell | G08B 21/22 |
| 10,154,575 B2* | 12/2018 | Schlangen | H05B 47/155 |
| 10,255,880 B1* | 4/2019 | Herf | G09G 5/10 |
| 10,347,163 B1* | 7/2019 | Herf | G09G 3/20 |
| 10,775,235 B2* | 9/2020 | Rajagopalan | H05B 47/11 |
| 10,859,753 B2* | 12/2020 | Lowes | G02B 6/0061 |
| 10,900,621 B2* | 1/2021 | Leung | F21K 9/61 |
| 2002/0008696 A1 | 1/2002 | Wagner | |
| 2004/0130555 A1 | 7/2004 | Ko et al. | |
| 2004/0165001 A1 | 8/2004 | Wang | |
| 2004/0225340 A1 | 11/2004 | Evans | |
| 2005/0052685 A1* | 3/2005 | Herf | H04N 1/00214 358/1.15 |
| 2005/0134547 A1 | 6/2005 | Wyatt | |
| 2005/0151489 A1* | 7/2005 | Lys | B60Q 3/18 315/308 |
| 2006/0069794 A1 | 3/2006 | Gorog et al. | |
| 2006/0069894 A1 | 3/2006 | Hollis et al. | |
| 2006/0152525 A1 | 7/2006 | Woog | |
| 2007/0239837 A1 | 10/2007 | Jablokov et al. | |
| 2007/0289182 A1 | 12/2007 | Reinold et al. | |
| 2008/0033633 A1 | 2/2008 | Akiyoshi et al. | |
| 2009/0016168 A1 | 1/2009 | Smith | |
| 2010/0118403 A1 | 5/2010 | Laitinen et al. | |
| 2010/0277076 A1 | 11/2010 | Tracy et al. | |
| 2014/0281926 A1* | 9/2014 | Brenneman | G06F 16/9577 715/238 |
| 2015/0022093 A1* | 1/2015 | Smith | A61N 5/0618 315/307 |
| 2015/0062892 A1* | 3/2015 | Krames | F21K 9/232 362/231 |
| 2015/0126806 A1* | 5/2015 | Barroso | H05B 47/115 315/153 |
| 2016/0234034 A1* | 8/2016 | Mahar | G05B 15/02 |
| 2017/0189640 A1* | 7/2017 | Sadwick | H05B 45/20 |
| 2017/0348506 A1* | 12/2017 | Berman | H05B 47/19 |
| 2018/0012468 A1* | 1/2018 | Fadell | G08B 19/00 |
| 2018/0042086 A1* | 2/2018 | Schlangen | A61M 21/02 |
| 2018/0043130 A1* | 2/2018 | Moore-Ede | A61M 21/0094 |
| 2018/0110960 A1* | 4/2018 | Youngblood | A47C 31/008 |
| 2018/0216791 A1* | 8/2018 | Leung | F21S 8/006 |
| 2019/0098725 A1* | 3/2019 | Sadwick | H05B 45/20 |
| 2019/0350066 A1* | 11/2019 | Herf | H05B 47/11 |
| 2020/0077942 A1* | 3/2020 | Youngblood | A61B 5/4812 |

FOREIGN PATENT DOCUMENTS

| | | |
|---|---|---|
| WO | WO 2011/089540 | 7/2011 |
| WO | WO 2016/033099 | 3/2016 |
| WO | WO-2021061655 A1 * | 4/2021 |
| WO | WO-2021156165 A1 * | 8/2021 |

OTHER PUBLICATIONS

"Color Correction definition," Creative Glossary [online] retrieved on Mar. 28, 2016. Retrieved from the Internet: <URL: http://www.creativeglossary.com/digital-fine-art-print-making/color-correction.html>, 1 page.

"Color correction," Wikipedia [online] Dec. 19, 2015 [retrieved on Mar. 28, 2016]. Retrieved from the Internet: <URL: https://en.wikipedia.org/wiki/Color_correction>, 3 pages.

"Color temperature," Webopedia [online] retrieved on Mar. 28, 2016. Retrieved from the Internet: <URL: http://www.webopedia.com/TERM/C/color_temperature.html>, 2 pages.

"Color temperature," Wikipedia [online] Mar. 12, 2016 [retrieved Mar. 28, 2016]. Retrieved from the Internet: <URL: https://en.wikipedia.org/wiki/Color_temperature>, 16 pages.

"F.lux Review," My Morning Routine [online] Dec. 22, 2014 [retrieved on Mar. 28, 2016]. Retrieved from the Internet: <URL: http://mymorningroutine.com/flux-review/>, 2 pages.

"F.lux," Product Hunt [online] Jan. 6, 2014 [retrieved Mar. 28, 2016]. Retrieved from the Internet: <URL: https://www.producthunt.com/tech/f-lux>, 3 pages.

"Light-emitting e-readers before bedtime can adversely impact sleep." Brigham and Women's Hospital [online] Dec. 22, 2014 [retrieved on Mar. 28, 2016]. Retrieved from the Internet: <URL: http://www.brighamandwomens.org/about_bwh/publicaffairs/news/pressreleases/PressRelease.aspx?PageID=1962 > 2 pages.

"Tungsten film," Wikipedia [online] Feb. 24, 2013 [retrieved on Mar. 28, 2016]. Retrieved from the Internet: <URL: https://en.wikipedia.org/wiki/Tungsten_film>, 1 page.

"Wratten number," Wikipedia [online] Jun. 24, 2015 [retrieved on Mar. 28, 2016]. Retrieved from the Internet: <URL: https://en.wikipedia.org/wiki/Wratten_number>, 7 pages.

Bakalar, "How E-books may disrupt your sleep," well.blogs.nytimes.com [online] Dec. 22, 2014 [retrieved Dec. 22, 2014]. Retrieved from the Internet: <URL: http://well.blogs.nytimes.com/2014/12/22/e-books-may-interfere-with-sleep/?_r=1>, 2 pages.

Beil, "In Eyes, a Clock Calibrated by Wavelengths of Light," The New York Times [online] Jul. 4, 2011 [retrieved on Mar. 28, 2016]. Retrieved from the Internet: <URL: http://www.nytimes.com/2011/07/05/health/05light.html?_r=0>, 5 pages.

Braga, "The Story Behind f.lux, the Night Owl's Color-Shifting Sleep App of Choice," Motherboard [online] Jan. 21, 2016 [retrieved on Mar. 28, 2016]. Retrieved from the Internet: <URL: http://motherboard.vice.com/read/the-story-behind-flux-the-night-owls-color-shifting-sleep-app-of-choice>, 11 pages.

Chang et al., "Evening use of light-emitting eReaders negatively affects sleep, circadian timing, and next-morning alertness," Proc Natl Acad Sci U S A., 112(4):1232-1237, Epub Dec. 22, 2014.

Charity, "What color is a blackbody?—some pixel rgb values" http://www.vendian.org/mncharity/dir3/blackbody/, Jun. 2001, 3 pages.

Falbe et al., "Sleep duration, restfulness, and screens in the sleep environment," Pediatrics, pii: peds.2014-2306, Epub. Jan. 5, 2015.

Gooley et al., "Exposure to room light before bedtime suppresses melatonin onset and shortens melatonin duration in humans," J Clin Endocrinol Metab., 96(3):E463-E472, Epub Dec. 30, 2010.

Hoebee, "F.lux: the favorite application on my PC," Dick Hoebee [online] Jul. 14, 2015 [retrieved on Mar. 28, 2016]. Retrieved from the Internet: <URL: http://dickhoebee.com/2015/07/flux/>, 4 pages.

Holzman, "What's in a color? The unique human health effect of blue light," Environ Health Perspect., 118(1):A22-A27, Jan. 2010.

Inhofer, "Color Grading vs. Color Correction: What's the Difference?" Lynda [online] Jul. 2, 2015 [retrieved on Mar. 28, 2016]. Retrieved from the Internet: <URL: http://www.lynda.com/articles/color-grading-vs-color-correction>, 5 pages.

(56) References Cited

OTHER PUBLICATIONS

International Search Report & Written Opinion in International Application No. PCT/US2019/032027 dated Oct. 1, 2019, 14 pages.
Jragar, "Take Back Your Sleep Pattern: f.lux Review," GMR tec [online] Feb. 8, 2016 [retrieved on Mar. 28, 2016]. Retrieved from the Internet: <URL: http://www.gmrtec.com/index.php/2016/02/08/take-back-your-sleep-pattern-f-lux-review/>, 9 pages.
Kabbani, "f.lux App Review: Why this is a must have app!" SwolePT [online] 2013. Retrieved from the Internet: <URL: http://www.swolept.com/posts/why-you-need-to-install-f-lux-free-app-review#.VvlDuU32a72>, 8 pages.
Kim, "Blue light from electronics disturbs sleep, especially for teenagers," The Washington Post [online] Sep. 1, 2014 [retrieved on Mar. 28, 2016]. Retrieved from the Internet: URL: https://www.washingtonpost.com/national/health-science/blue-light-from-electronics-disturbs-sleep-especially-for-teenagers/2014/08/29/3edd2726-27a7-11e4-958c-268a320a60ce_story.html>, 4 pages.
Mann, "F.lux Review: The Software That Makes You Sleep Better," Sleep Junkies [online] Dec. 4, 2012 [retrieved on Mar. 28, 2016]. Retrieved from the Internet: URL: http://sleepjunkies.com/tools/flux-app-review/, 13 pages.
Mantiuk et al., "Display Adaptive Tone Mapping—Supplementary Materials," ACM Transactions on Graphics (Proc. of SIGGRAPH), 2008, 3 pages.
Mantiuk et al., "Display Adaptive Tone Mapping," ACM Transactions on Graphics (Proc. of SIGGRAPH '08) 27 (3), article No. 68, 2008, 10 pages.
Pash, "F.lux Changes Your Screen Brightness by Time of Day," Lifehacker [online] Feb. 23, 2009 [retrieved on Mar. 28, 2016]. Retrieved from the Internet: <URL: http://lifehacker.com/5158832/flux-changes-your-screen-brightness-by-time-of-day>, 2 pages.
Robinson, "This app has transformed my nighttime computer use," Tech Insider [online] Oct. 28, 2015 [retrieved on Mar. 25, 2016]. Retrieved from the Internet: <URL: http://www.techinsider.io/flux-review-2015-10>, 6 pages.
Schifreen, "A Reminder: If You Use Windows, Just Get Flux," Gizmo's Freeware [online] Jan. 13, 2015, [retrieved on Mar. 25, 2016]. Retrieved from the Internet: <URL: http://www.techsupportalert.com/content/reminder-if-you-use-windows-just-get-flux.htm>, 6 pages.
Searing, "Sleep troubles? Maybe electronic devices are interfering with bedtime," washingtonpost.com [online] Jan. 5, 2015 [retrieved on Jan. 7, 2015]. Retrieved from the Internet: <URL: http://www.washingtonpost.com/national/health-science/sleep-troubles-maybe-electronic-devices-are-interfering-with-bedtime/2015/01/05/0ca0ebd8-905e-11e4-ba53-a477d66580ed_story.html>, 4 pages.
Smith, "This free app makes reading a computer screen at night much easier," Business Insider [online] Mar. 25, 2013 [retrieved on Mar. 28, 2016]. Retrieved from the Internet: <URL: http://www.businessinsider.com/flux-software-helps-ease-your-eyes-2013-3>, 3 pages.
The Lifehacker Staff, "The 50 Free Apps We're Most Thankful For," Lifehacker [online] Nov. 16, 2015 [retrieved on Mar. 28, 2016]. Retrieved from the Internet: <URL: http://lifehacker.com/5962588/the-50-free-apps-were-most-thankful-for>, 35 pages.
Turnbull, "50 Mac Essentials #13: Flux," Cult of Mac [online] Sep. 20, 2010 [retrieved on Mar. 25, 2016]. Retrieved from the Internet: <URL: http://www.cultofmac.com/59821/50-mac-essentials-13-flux/>, 15 pages.
Vanhemert, "The UI inventions we want to see in 2015," wired.com [online] Jan. 6, 2015 [retrieved on Jan. 7, 2015]. Retrieved from the Internet: <URL: http://www.wired.com/2015/01/ui-inventions-want-see-2015/?mbid=social_twitter>, 5 pages.
Wernick, "Losing sleep? Blame your favorite electronic device," Public Radio International [online] Jan. 27, 2015 [retrieved Mar. 28, 2016]. Retrieved from the Internet: <URL: http://www.pri.org/stories/2015-01-27/losing-sleep-blame-your-favorite-electronic-device>, 7 pages.
Wikipedia, "f.lux," Wikipedia [online] Mar. 11, 2016 [retrieved on Mar. 25, 2016]. Retrieved from the Internet: <URL: https://en.wikipedia.org/wiki/F.lux>, 3 pages.
Woods, "F.lux finally comes to Android to save your eyes," The Next Web [online] Mar. 15, 2016 [retrieved on Mar. 28, 2016]. Retrieved from the Internet: <URL: http://thenextweb.com/apps/2016/03/15/f-lux-automatically-controls-androids-screen-reduce-strain-eyes/%20-%20gref/>, 4 pages.
Yurek, "Apple CEO Tim Cook talks color quality at Goldman Sachs conference," Nanosys [online] Feb. 13, 2013 [retrieved on Mar. 28, 2016]. Retrieved from the Internet: <URL: http://www.nanosysinc.com/dot-color-archive/2013/02/13/apple-ceo-tim-cook-talks-color-quality-at-goldman-sachs-conference> 4 pages.
Zukerman, "Review: f.lux makes your computer usable at night," PC World [online] Oct. 31, 2013 [retrieved on Mar. 28, 2016]. Retrieved from the Internet: <URL: http://www.pcworld.com/article/2056895/review-f-lux-makes-your-computer-usable-at-night.html>, 8 pages.

* cited by examiner

COORDINATED LIGHTING ADJUSTMENT FOR GROUPS

CROSS-REFERENCE RELATED APPLICATIONS

This application claims priority to U.S. application Ser. No. 62/670,513, filed on May 11, 2018, the entire contents of which are hereby incorporated by reference.

TECHNICAL FIELD

This document generally describes technology related to generating physical illumination, including in the improvement of computer operation for generating physical illumination.

BACKGROUND

The effect of light on circadian timing and sleep patterns is roughly understood—with studies showing that the timing of, and quality of, light that enters the eye directly impacts timing (phase) of the central clock (SCN (the "Suprachiasmatic Nucleus" in the hypothalamus) and its amplitude, and by doing so, affects a person's ability to get to sleep quickly at night, and to have quality sleep. For example, light from portable electronic devices used before bedtime delays circadian phase, and students who use devices before bed tend to get substantially less sleep than those who do not.

Bright light can suppress the body's production of melatonin, the body's "darkness" hormone. Via the SCN, which is entrained primarily by light, our bodies synchronize circadian rhythms of physiological functions that include readiness for sleep, blood pressure, insulin resistance, and alertness. Melatonin is used as a marker of circadian function, and the timing of its release is one of the best indicators of circadian "phase," via the DLMO (dim light melatonin onset).

Improper alignment of a person's SCN and their external environment can cause problems for them. Jet lag is one example of problems created by a mismatch between a person's external environment and circadian phase—where the person's local time zone changes, and his or her central clock takes some time to adjust to the new conditions. And it is light, particularly from the cool (blue) end of the color spectrum and typically produced by electronic devices like laptops and tablets, that can cause phase shifting of the central clock and acutely prevent the pineal gland from releasing melatonin. The effects can be particularly serious for teenagers, whose circadian rhythms are typically "late" (out of alignment with normal societal sleep timing), and who are more likely to use portable computing devices held very close to the face.

The internal human clock's response to light (via "phase shifting") varies throughout the day, in a way that is described via a PRC (a "phase response curve"). Light seen in the subjective morning shifts the person to an earlier circadian time, and light seen in the subjective night will shift the clock to a later time. In the middle of the day, phase shifts are not as apparent. As described more fully below, differences between individual PRCs at the same external "clock" time can be used to synchronize groups of individuals who may have different circadian timing needs.

At night, a person's production of melatonin can be affected positively by varying the color temperature of light presented to the person, such as by changing the spectrum of electric lights or computer displays to reduce the wavelengths of light that affect the clock: toward the warmer (red) end of the color spectrum in the evening; and also by dimming their overall intensity. Through the non-visual photoreceptors (ipRGCs), the central internal clock is able to determine the timing of day and night. Indirectly, then, a person's sleeping time may depend on a number of factors, and different individuals may choose a unique "phase angle," the relationship of the central clock and the timing of sleep. For most people, circadian time predicts sleep timing within a few hours, with people finding it difficult to sleep outside of an ideal window relative to their clock. Recent improvements in display technologies mean that larger displays can produce more "non-visual" stimulating light than most other sources do after dark.

SUMMARY

This document generally describes computer-based technology for changing the level of stimulating light received by someone who uses various light-producing or light-modifying appliances, such as electric lights, computer-controlled window shading, and computers (e.g., desktops, laptops, tablets, VR displays, and smartphones). Discussed here are efforts to adjust, not just timing of light that a user or multiple users receive, but also the quality and amount of light for a particular user or a coordinated group of users.

In certain discussions herein, the provision of stimulating light (e.g., by one or more of timing, strength, and quality (e.g., color temperature or spectrum of a display)) is changed so that two or more users may have their sleeping cycles better coordinated, such as by causing a night owl spouse to get tired earlier, and the other spouse to get tired later. Such changes to the two users' sleep schedules may be carried out automatically in situations where (a) lighting is shared (using the timing of shared light for a group of students in a classroom in the morning, or in a living room for a co-habitating couple at night) and (b) in cases where the light is personal to one individual, such as by changing the color temperature or spectrum of a laptop of tablet computer for one of the users in a manner different than a change or color temperature setting for a device of the other user or other users. Such automatic changes may occur by a system determining a goal for the users, identifying lighting changes for each user to best reach the goal, and then adjusting shared or individual lighting accordingly and automatically.

The changes may also be performed more manually, such as by generating a notification (e.g., textual, graphical, and/or audible) that tells one of the users to make a change, such as telling the user to turn on or off lights in a room, or telling one of the users to move into a different room so that the ambient light (e.g., light intensity, spectrum, or color temperature of the light) provided to the two users can be changed independently. Other changes may be semi-automatic, such as by a user's computing device displaying a notification with text telling the user that a change is going to be made, and then making the change for the user if the user responds affirmatively (e.g., by clicking an "okay" button) or non-affirmatively (e.g., by the user being presented with a "cancel the change" button, and not selecting the button).

In situations when a majority of the lighting is shared, the timing of light may be used to cause differential phase shifting in one individual vs. another individual with different goals. Specifically, a particular time of day (whether that is "external" clock time or "internal" time relative to a particular person's daily sleep/wake cycle) may be determined to be a best time to provide stimulation to best affect a portion of a group of people, such as the night owls in a classroom. For instance, while "light therapy" for SAD (seasonal affective disorder) commonly recommends a pulse of light in the morning (based on the "phase shift hypothesis"), differently-timed pulses can be used to address different needs in a group. As an example, the systems and methods described here may propose delivering a pulse of light later in the morning, to have a smaller effect on early birds, while having a larger resetting effect on night owls, who are still in the "advancing" portion of their individual PRC.

Similarly, pulses of light may be used to minimize energy usage, so while eight hours of constant bright light may have a desired effect, when that light is generated using electrical means, an hour of the same light may be more desirable from an energy conservation perspective. Because non-visual effects often take greatly increased levels of lighting, the ability to optimize the timing of these pulses (so that shorter durations can work nearly as well as longer ones) can be important for conserving energy.

In other examples (which may be an alternative to that just discussed or combined with it), the brightness of a particular device may be over-driven—i.e., set to a brightness level that is noticeably higher than it would be set under a standard brightness setting that is intended to match the brightness to ambient settings. Such over-driving may provide extra visual excitation for a user and thus act to shift circadian timing. For example, a laptop computer may be automatically given a brightness setting in a relatively dark room that is equal to the setting it would otherwise have for a bright room or even outdoors on a sunny day (and thus noticeably and substantially brighter than it would normally be in the dark room). Similarly, this light exposure may be "titrated" based on usage, so that a specific circadian goal is achieved: for example, looking at a nearly-white screen continuously may require less time to achieve the same effect, compared to watching a movie (which may not be intense enough to have a large circadian effect). Systems as described below may be programmed to identify a program for a person, employing among other things data about prior schedules and electronic device usage by the person, that may combine various lighting presentations for the person at various times of their day—e.g., white light for a certain period at a certain time, followed by adjusting the color temperature to illuminate the display while the user performs ordinary work such as word processing.

The level of change that is made for the display settings of a device may also be dependent on the character of the content being displayed on the device. For example, where brightness is the variable being controlled to have an effect on a user, the change in brightness for content that is largely a white screen (e.g., use of a word processor) may be less than that when the content is a less white screen (e.g., watching a playing video). The system may be programmed to identify the form of the content and may make greater or lesser adjustments as a result of identifying the form of the content, so as to achieve the particular goal for an individual user (e.g., shifting sleep or wake time by n minutes).

Unless mentioned otherwise, the automatic (e.g., via a computer associated with a particular user or a more general computer such as a home-automation server or server remote from the user) and manual (e.g., via notification and user responses) measurements and device settings discussed herein may be performed for a single user alone, for a pair of users (e.g., people who live together and want to sleep closer in time together), and larger groups (e.g., people in a common work group or in a classroom together). These groups may have individuals who vary in their sensitivity to light (as happens by age and genetic factors), who differ in their intrinsic period (e.g., people with an internal day much greater than 24 hours typically become night owls), or who differ in their light history (for instance, shift workers who spend time off work outdoors vs. indoors). Each of these factors alone or in combination with each other can be taken into account in determining what changes it light delivered to each user will best help reach a goal for that user alone and/or a combined maximized goal for the group (e.g., to achieve 75% of a goal for both people in a couple, rather than 95% for one and 10% for the other).

Such management of stimulating light can be used to better manage each person's circadian rhythms so as to better enable them to fall asleep at an appropriate time, so that they get a good night's rest—and so that their rhythms are better coordinated with each other, such as to improve their relationship, e.g., by helping them fall asleep and wake at times that are closer in time so that they can plan activities such as meals, periods of exercise, and similar activities together, and spend a more appropriate amount of time alone and together. For larger groups, coordination may help ensure that all members of the group obtain adequate sleep and that they are all alert as is practical when they are together as a group and trying to achieve certain goals. It may also be used in appropriate circumstances to ensure that they stay awake, such as when they are performing a job that requires alertness for maximum safety, or when they plan to travel together to a particular location and need to be alert to operate a plane or automobile. All of these situations include an ideal phase for the individuals (for instance, shift workers needing to adjust to a later phase and high school students needing an earlier one), and also the intent to reduce, to the extent practical, the differences between individual phases in the group.

For example, as described in more detail below, various aspects of light-producing appliances (e.g., electric lights (e.g., lamps or whole room lights like in-ceiling can lights, computing devices, etc.) can be controlled in coordination with other aspects and in a way that is also coordinated as between and among multiple people and among multiple different appliances, such as by coordinating various parameters of multiple computer displays or tunable light fixtures. For example, increases in brightness and shifts in spectrum and color temperature toward the blue end of the light spectrum may (individually or in combination) produce greater stimulating light and thus shift circadian timing according to individual PRC (phase response curve), where the change in stimulation may come from an electronic device (or devices) the person is using (e.g., laptop, tablet, or smartphone) or from ambient light such as lighting for a room in which the person is sitting, or both.

Where electronic sleep records (which include data indicating habitual recent sleep timing) may indicate that the person will likely tire before their preferred bed time, lighting stimulation at night may be increased for them, such as by giving them a notification to obtain more stimulation, to turn on ambient illumination or move to another room, or by automatically changing the brightness (raising it) or color temperature (to a cooler temperature) of a device or devices and/or ambient lighting for the user (with the option of alerting the user before the automatic adjustment is made). The light stimulation for another person (e.g., the first person's spouse) may be adjusted in the opposite direction (e.g., dimmer and toward the red end of the spectrum), if that person is determined by the system to be likely to tire after the person's preferred bed time, which may be coordinated to essentially match the first person's preferred bed time.

In some examples, the adjustments may be made across a larger group. For example, a classroom of students may have their activity tracked (e.g., with wrist-attached activity trackers) to determine which of them are becoming inactive before or after a desired bed-time. The individual devices (e.g., tablet computers) of the users may be adjusted in their intensity (e.g., brightness and/or color temperature and/or spectrum) to adjust sleep times of particular students forward or backward, to achieve a level of wakefulness and attention for the class that is optimized. Also, the ambient lighting in a classroom may be adjusted to shift the entire class, such as by shifting sleep times generally earlier when a much larger number of students in the class need such a shift or need a larger shift, as compared to students that may need a shift in the other direction. Pulses of light may be delivered at times when they will more strongly influence one subgroup vs. another.

Also, the class may be split through space, with a teacher being provided, on her computing device, a list of students who need less visual stimulation, so that she can seat them in the front of a room where the overhead lights have been turned off, turned down, and/or lit closer to the red end of the visual spectrum. In each of these examples, one or more users may have their devices adjusted automatically or upon receiving an affirmative response from the particular user, so as to have a brightness that is substantially higher than the device would otherwise provide under the current ambient lighting conditions—where such super-brightness may be at a level that shifts circadian rhythms in a user. The super-brightness may be accompanied, in appropriate circumstances, by shifting the device color temperature toward the blue end of the spectrum and/or by adjusting ambient lighting determined to be around the user.

For each such instance, a system may select a time of day during which to apply a change in stimulation (e.g., changing the color temperature of room lights or a laptop computer display) so that the change can have maximum or most precise effect on a user or users—toward reaching a predetermined goal for each user (e.g., to align their sleep times or wakefulness times). Where multiple users are being subjected to the same stimulation (e.g., they are in one room under the same room lights), the time of day for adjusting the stimulation (along with the type and amount of change) can be selected to synchronize the group, in order to reduce the differences in their individual phases, while minimizing energy used.

Within each of these instances also, the particular lighting intensity (as with the color temperature) for any particular user may change over the course of a day based on goals of the lighting program (and may be coordinated with such changes for other users subject to the same ambient lighting for at least part of the day, e.g., because they are determined by the system to be located in the same room as a first user)—e.g., blue light may be maximized in the morning and may be minimized in the evening, and the schedule for such transition may depend on the desired bed time of the particular user, their geographic location that determines the timing of available daylight, the level of lighting excitation they have been determined to have received during the day, and their historical sleeping cycle as a function of lighting excitation. Specifically, the particular levels of change in one or more parameters (e.g., computing device brightness, computing device color temperature, ambient light brightness, and ambient light color temperature), along with notifications that electronic devices can provide to users so that the users will create a change in one of the parameters (e.g., by adjusting room lighting, closing shades, or moving to a different room) may be configured so as to provide a desired overall level of stimulating light for each user over a time period, such as over the course of an entire day (one circadian cycle), or over a period determined to have a material effect on each person's ability to get to sleep at a proper hour, such as starting a change in excitation several hours before that bed time, or starting at a time relative to dusk (when natural visual stimulation ceases, and artificial takes over).

Such a desired level of excitation that takes into account multiple factors may be a generally consistent level over time (after the transition occurs), so that an external input to a device that relates to one parameter (e.g., a change in screen brightness), may result in the computation and effecting of an offsetting change in another parameter, so that the melanopic effect on each user of a device does not change when one input changes, or is maintained at a value (that may be updated over time) determined to keep the melanopic level flat for before and after the change.

The level of melanopic effect from visual excitation for a particular user may be measured and/or computed at the eyes of the user, and may include light from the device, light from other devices, and ambient light. Such measurement may be made via sensors placed near the user's eyes (e.g., in the front surface of a pair of electronic glasses worn by the user) or by sensors aimed toward the user's eyes and/or face from a distant device (e.g., near or in the screen of a computing device they are using). For example, a light sensor may measure light levels reflecting off a user's eyes and/or skin and use such sensed values to compute the melanopic effect in various manners for the user. The effect received by the user may also be computed, such as by measuring or assuming a distance from a device screen to the user's face/eyes, and determining an amount of the light that will likely hit the user's eyes, plus perhaps additional ambient light which may be computed by starting with an ambient light sensor on the device.

The light levels to which users are subjected may also be determined by inference. In some examples, each brand and model of computing device that are employed by users may be tested (e.g., directly such as by using measurement devices that may attached to a screen of the device, or indirectly such as by varying properties of such a device for a large number of different users, and then determining statistically the effects that such changes have across the large number of users) and its stimulating effect may be modeled and then added to a database that can be consulted later to determine the stimulating effect that make and model will have on particular users.

In some examples, the computing device adjustments may be made in brightness, in color temperature, in spectrum (which may affect color temperature), or any combination— and with one or the other as the independent variable or both as dependent variables (and for a single person or multiple people in combination). For example, one resident of a house may manually increase the brightness in a room via a light switch slider, and computing devices of other people in the room may sense such a change and adjust to a warmer color palette to counter some of the effect of the brighter room lights (though a user may lock their color temperature or spectrum from being automatically changed if, for example, they are in a digital image editing application— and in such a situation, such a user may be provided a notification by the lighting system that their stimulation is too high and that they should leave the room if they do not want other adjustments made). In such example, brightness is the independent variable that is compensated for using other dependent variables. In another example, a user may be working on a laptop and determine that the colors do not appear accurate. The user may adjust the overall color of the computer display (e.g., by selecting a choice to return their display from adjusted color temperature to "accurate" colors), and the computer may then lower or raise the display brightness to compensate for the change in stimulating light level created by the color temperature adjustment.

In coordination, a computer that controls lighting in the room may change the color temperature of one or more light fixtures, or actuators on window blinds may be powered so as to open or close the blinds, so as to further achieve a level of desired light stimulation for one or more people in the room. The adjustments made to each of multiple computers in the room used by different people who are indicated in the system as linked to each other may each depend on a determination that seeks to match the sleep or wake schedules of the multiple people with each other, or another goal applied across the multiple people in coordination.

In one implementation, a computer-implemented method for controlling display of a light-generating appliance is disclosed. The method comprises identifying existing circadian cycle parameters for a plurality of electronic device users; identifying a common goal regarding circadian cycles for the plurality of electronic device users; determining a degree and direction of circadian cycle adjustment needed for each of the plurality of electronic device users in order to meet the common goal; and providing instructions to the users or devices of the users, wherein the instructions cause changes in artificial lighting provided to each of the users so as to achieve the goal, and wherein the changes for each of the users differ from changes caused for one or more of the other users. The method can also include determining a time of day to make the changes for each of the electronic device users, wherein the determined time of day is selected to maximize progress toward the common goal for one or more of the users; and providing instructions to the users or devices of the users to carry out the changes at the determined time of day.

In some aspects, the time of day is a time relative to a wake-sleep cycle of the particular user. In other aspects, the time of day is a clock time. The change in artificial lighting can comprise a change in a brightness level of a device for the particular user and/or changes in lighting from a personal device for a particular user, and changes in ambient lighting determined to affect the particular user and one or more others of the electronic device users.

In another implementation, a computer-implemented method for controlling display of a light-generating appliance is disclosed that comprises determining a level of lighting provided to a user of an electronic device by the electronic device; determining a level of ambient lighting provided to the user; and generating instructions automatically to cause a change in a lighting level for the user based on a comparison of (a) the determined level of lighting provided by the electronic device, and (b) the determined level of ambient lighting.

In yet another implementation, a computer-implemented method for controlling display of a light-generating appliance is disclosed that comprises identifying existing circadian cycle parameters for an electronic device user; identifying a goal regarding circadian cycles for the electronic device user; determining a degree and direction of circadian cycle adjustment needed for each of the plurality of electronic device users in order to meet the goal; providing the electronic device user with a notification that identifies to the electronic device user the determine degree and direction of circadian cycle adjustment.

And in another implementation, a computer-implemented method for controlling display of a light-generating appliance is disclosed that comprises identify existing circadian cycle parameters for a plurality of electronic device users; identifying a goal regarding circadian cycles for the plurality of electronic device users; determining a degree and direction of circadian cycle adjustment needed for each of the plurality of electronic device users in order to meet the goal; and upon determining that the degree and direction of circadian cycle adjustment cannot be achieved using stock settings for a particular electronic device of the user, overdriving a lighting output of the particular electronic device above what the device would deliver using its stock settings.

In another implementation a computer-implemented method of lighting control is disclosed. The method comprises identifying a group of people according to a relationship between or among the people that indicates the people are likely to regularly reside in a common location; determining a goal for the group of people for reducing phase differences in circadian cycles of people in the group of people; determining a time and manner for altering ambient light at the common location in a manner to achieve the determined goal; and generating control signals to cause ambient lighting appliances at the common location to alter their performance according to the determined time and manner to achieve the determined goal. The ambient lighting appliances can be altered in performance by creating pulses of increased lighting at particular times of the day. Also, the method can further comprise determining which ones of the people in the group of people are present at the common location in association with generating the control signals. The method also can comprise determining subsequent sleep/wake times for each of the people in the group of people, and providing subsequent signals to alter performance of the ambient lighting appliances as a function of the sleep/wake times and further to achieve the determined goal.

The systems and techniques just discussed may also be carried out using particular physical media or computer-implemented systems. For example, the actions discussed above may be carried out as operations by the execution of code that is stored on one or more tangible, non-transitory machine-readable media (where the execution may occur via one or more processors in communication with the one or more media). In some implementations, such media is part of a system and is in operable communication with one or more computer processors that execute code to generate the operations.

In certain implementations, the systems and techniques discussed here may provide one or more advantages. For example, a system may adjust one or more appliances for one or more users alone or in coordination to limit the amount of stimulating light levels a person or different people receive so as to allow them to have quicker and better sleep, or sleep (or wakefulness) that is closer in time with each other. Such adjustments may be announced to a user (e.g., by text on a computer display), as may instructions or notifications for other actions the user can take to help their sleep (e.g., telling a user to adjust their lights or blinds, or to open or close an airplane window shade, or to leave the room if they cannot make such adjustments because other people are in the room). Certain adjustments may delay sleep (including by over-driving the brightness or color temperature of a device above what it would normally provide even at a normal maximum).

The adjustments may also be incorporated as part of a much broader lighting-management suite for a user, including with the measuring of light levels around a user at many different times of day across a long time period (e.g., months), and aggregating such data from many different users (e.g., thousands of users) so as to identify trends and patterns in the light to which different people are subjected, and the effect of such light on the activities of such users (e.g., where age, gender, and other factors may be correlated with particular reactions to lighting stimulation). For example, light measurement can be combined with activity measurement (e.g., from a fitness band) and demographic information (e.g., age, race, and gender) and survey information provided by the various users (e.g., identifying how healthy they feel, whether they believe they obtain adequate sleep, etc.). Such combined information can be used by researchers, e.g., to develop better techniques to improve the sleeping health and general health of the users.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
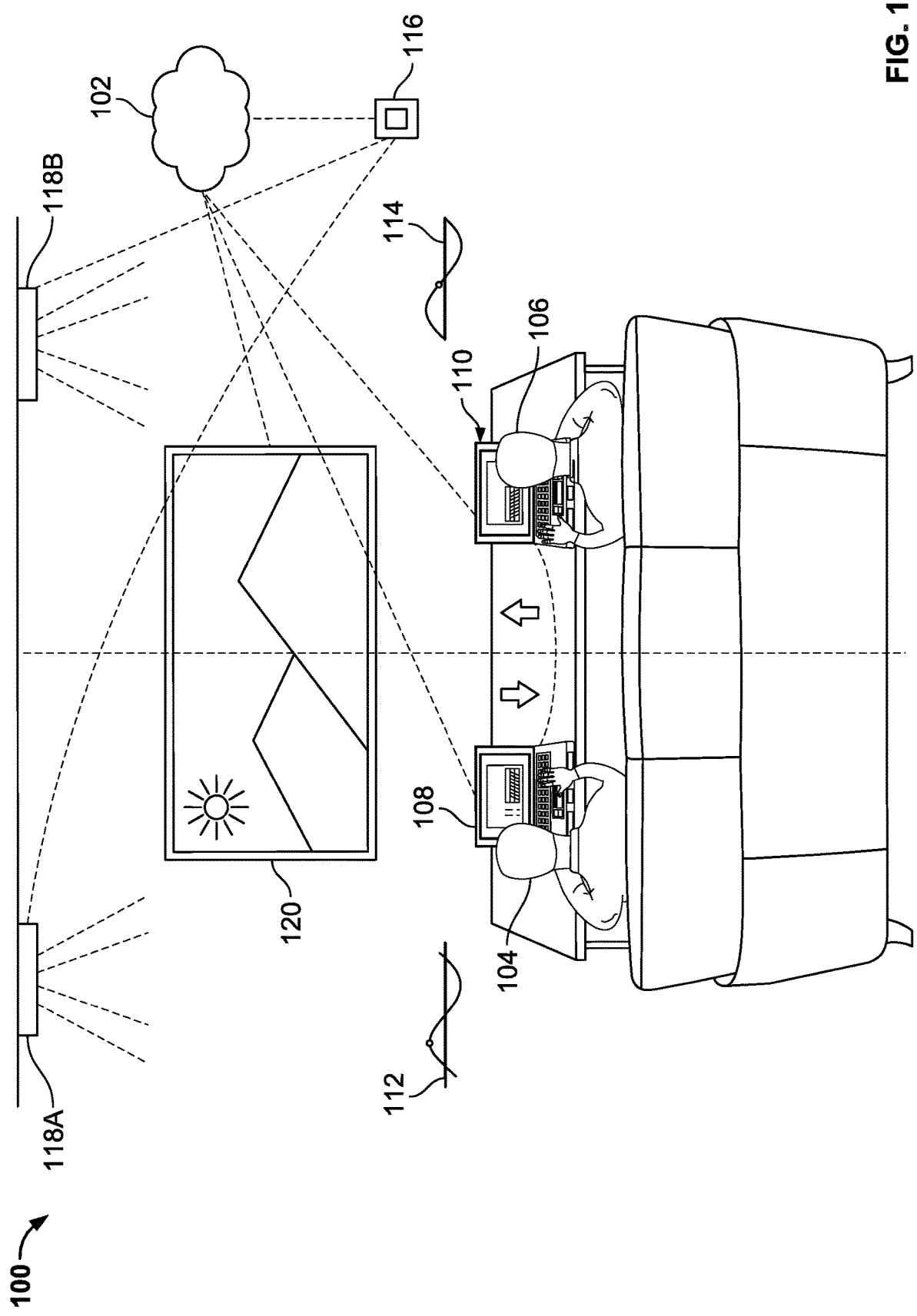
FIG. 1 is a conceptual diagram showing coordinated adjustment of lighting parameters for multiple people.

This document generally describes computer-based systems and techniques that can be used to control lighting provided to particular people and to electronically coordinate lighting provided to multiple people, including users of different computing devices such as laptop or tablet computers. The techniques may include automatically (or manually with automatic guidance) adjusting parameters for an electronic device (such as brightness, color temperature, and spectrum) used by each person so as to push each person toward a more common sleep/wake cycle, or to achieve other predetermined goals related to the sleepfulness or wakefulness of one person or a group of people in coordination with each other. Where coordination is provided, certain users may be pushed in the same direction by the lighting changes (e.g., where two users are most wakeful before school and need to be pushed back) and certain may be pushed in the opposite direction (e.g., where other users are most wakeful after school and need to be pushed forward). Where just two users are coordinated with each other, both may be pushed in the same direction (to the same or a different degree) or each may be pushed in an opposite direction as the other (to the same or to a different degree)—e.g., with one person's sleep time being pushed backward and another's pushed forward toward a common sleep time.

The adjustments can be made automatically without notifying a person, and also can be made by providing notifications to one or more of the people or to a third party so that they can manually or semi-automatically make proper adjustments that bring their sleep/wake cycles into closer alignment (by reducing phase differences in daily sleep/wake or alert/in-alert cycles as between and among members of a group of two or more people). In certain instances, the adjustments can be made to over-stimulate a device user as compared to the stimulation they would ordinarily receive from a device that is simply tuning its brightness or color temperature to its setting—i.e., if a system determines that a user's sleepfulness needs to be delayed, it may drive a laptop computer display to be overly bright and closer to the blue end of the color temperature spectrum. In other examples, lighting appliances may provide pulses of light in a particular form (e.g., with an elevated blue level or elevated intensity, or both), so as to provide a desired stimulation without having to change the output of the appliance steadily.

In certain implementations, a computing system may first identify a group of users (two or more) that are resident together, e.g., because they explicitly identified themselves to the system as such or because the system is able to determine from geo and timing information that they are—e.g., that they live together, work together, are in school together, or otherwise spend substantial amounts of time together (as determined from geo data reported by their respective personal devices). The system may then identify a goal for the users, such as to more closely align the times at which they are sleepy (e.g., for co-habitants) and/or the times they are most sharp (e.g., for classmates). The system may determine where each person is relative to that goal—e.g., may check wrist-worn and/or bed-monitored activity tracker data to determine a typical sleep time and wake time for each of a pair of co-habitants, then determine how far each has been, on average, from a desired sleep time. The system may then determine steps that may be taken for each user to better reach the goal of alignment, which may include altering brightness or color temperature or spectrum of each user's mobile computing device at particular times of day, changing brightness, spectrum, and color temperature of ambient lighting in a room that one or both users sit in, and also providing each user with notifications such as instructions to close drapes in a room or to turn off or on the lights in a room. The system may then continue to monitor activity data for each user, and may adjust the plan that it then implements so as to adjust for problems in the initial plan (e.g., if the results of the initial plan are found to under-shoot or overshoot the goal of the plan).

One type of excitation that the system may monitor involves the relative excitation being provided by each user's electronic device that particular person is viewing and the ambient light level (brightness, color temperature, spectrum or a combination of two or more) around them. The excitation from the device may be determined from directly measured values or published lighting specifications (e.g., screen-reported luminances and chromaticities, EDID data, etc.) for the device along with information about typical distances that users position their eyes from such a device (e.g., as reported from surveying users and their distance of a display from that category of device) and along with information about what the device's display has been displaying recently (e.g., by monitoring screen dimming and color transforms from a graphics card in the device).

One or more notifications can then be generated when the excitation level the user is computed to be receiving is significantly out-of-scale with what the user should be getting in order to hit a particular goal sleep or wake time. Such a notification may encourage the user, via displayed text on their computing device (e.g., laptop, tablet, or television), to turn down or off their room lighting or to close drapes, when the user does not have automatically controlled lights or drapes that can be controlled from the computer system that is making such determinations for the user. The notification may also allow a user to approve or disapprove a change in parameter values (e.g., indicate in response to a prompt that the user is not going to change the lighting or shade levels, or does not want them changed automatically), and the system may then automatically make the change or not make it based on the input the user provides.

Devices that can be controlled by the system may also be adjusted over time as the user environment changes, so as to achieve or maintain a particular melanopic effect. For example, in the short-term, a level of overall color temperature change for a user's computing device may be selected by an application running on the device to effectively totally offset the effect generated by an increase in brightness on that device from the user adjusting the brightness (where "overall" change is applied consistently across the display and consistently to multiple different items having multiple different colors, as opposed to simply changing colors of particular components, such as in changing a theme), or by the system sensing that the user has left a dark room and entered a lit room (or vice-versa). Such adjustments may also be subject to particular limits—e.g., a certain color temperature may be determined (e.g., from overall testing with consumers or with a particular person providing a setting for his or her devices) that is the maximum permissible adjustment (either overall or at a particular step in adjustment), because going any further would be visually offensive. Thus, if the brightness is increased too far, the change to warmer colors as a compensation may only partially offset the melanopic effect of the brightness increase because any greater change in color temperature would be too jarring or too far from the norm.

Levels for any device or devices to which a user is subjected may may also be changed over the long-term. For example, a user's response to changes in lighting may be predetermined from a number of factors, including gender, age, race, light sensitivity testing of the person (e.g., providing the person with example lights, color temperatures, etc., and gauging the person's reaction to them via feedback from the person), lunar cycles, menstrual cycles, average pulse rate, genetic marker information (e.g., from sequencing or identification of phenotypic markers), whether the person wear glasses, or other factors determined to have an effect on how and how much a person may respond to particular change in lighting quality that they receive. Those factors may be used to set initial lighting values for the person. Subsequently, the process may operate for a defined period of time, such as two weeks, and information may be obtained by a computing system about how each person's sleep and wake patterns have changed. Such data may then be used to change settings for the user's lighting devices. For example, if one user is having her sleep time move backward more quickly than anticipated, and another is moving forward more slowly than anticipated, the system may updated the values provided to each user from their respective devices to slow the progress of the first user and speed the progress of the second user, so that they both hit the initially-determined goal at about the same time.

In other instances, the provided values may be adjusted to compensate for external effects on a user's schedule. For example, while a user may typically have a set sleeping schedule on weekdays when the user is not traveling, the user's schedule may change on weekends, when traveling, or for other similar reasons (e.g., they attended a late concert during the week). A system may identify such perturbations from a normal schedule when they occur, and adjust the timing, form, or intensity of lighting provided to a user as a result of identifying a perturbation in the user's schedule, and with a goal toward maintaining the original goal of shifting the user's sleep/awake patterns (e.g., to continue merging the user with her spouse, to the extent practical and along a practical timeline, subject to the disruption from the perturbation).

As noted, the adjustments may be made across multiple different kinds of light-generating appliances to which a user is currently subject to—including computers, televisions, and room lighting—and may also take into account light input from non-controllable sources, both artificial and natural. For example, a light sensor, or data about current time of day and cloud cover, may provide an indication of the natural light to which a person is currently subject (with assumptions about certain factors, such as typical size and transmissivity of windows in an office building), and a determination about a color temperature change for a computer (in response to a brightness change) may be reduced, out of an understanding that the computer is only one of multiple visual stimuli that the person is currently receiving. Where changes to spectrum of a device are noted as being made, the changes may occur, e.g., by filtering ranges of light spectrum out of a provided signal, by reducing ranges of the spectrum in intensity in a significant manner, by compressing the spectrum or ranges of the spectrum, by providing two different back-light sources for a computing display that have different spectrum characteristics, or other mechanisms. The changes in spectrum can result, in particular circumstances in corresponding changes in color temperature.

By these general mechanisms then, various lighting-related changes can be made over time for individual users (e.g., by adjusting their respective computing devices) and groups of users (e.g., by adjusting room lighting) so as to achieve a melanopic goal and to maintain that goal as the users' contexts change; to incorporate information about the users' prior contexts to best select a goal for control of such a system (e.g., if one user has received much more outdoor light than usual, then they will be given much less lighting exposure); to achieve a goal that is shared by multiple users, such as by changing two users' sleep time in opposite directions so as to be closer to each other; and to adjust the settings for devices in the system over time, while still aiming to meet a defined goal for the user, as the user's situation changes in unexpected ways (e.g., the user travels to a new time zone or stays up excessively late one night).

Generally, the desired melanopic effect may be directed at maintaining stimulating light (perhaps after adjusting the light) to each person at a level that will allow that person to avoid being unduly stimulated by visual inputs leading up to a bedtime or wake time for the particular person—where excess visual stimulation is the amount determined to have an undue effect on time to sleep for the person. For example, as changes are made to a device that might affect the melanopic effect the device is providing (e.g., the device receives an external user input to adjust brightness up or down, or a similar change effected by an ambient light sensor), corresponding changes can be made in other parameters so as to offset the first change, so that the melanopic effect is maintained at a constant level as compared to before and after the changes are made. Or instructions may be provided to one or more users so that they bring about similar offsetting changes (e.g., by the user making a manual change or by the user approving an automatic change).

The melanopic effect may be a particular level of light as generated by the device, or as measured at the user's eyes. For example, a determination can be made about how far the user's face is from a computer screen, and a light level of the screen may be identified so as to determine the light level at the user's eyes (where ambient light conditions may additionally be considered).

FIG. 1 is a conceptual diagram showing coordinated adjustment of lighting parameters for two people. The systems and operations shown in the diagram and described below may use the techniques described above in this document. In general, a system 100 is shown with respect to a person 104 and a person 106, who are represented as sitting side-by-side on a couch in a room. Generally, the discussion here concerns how the stimulating light levels provided to one, the other, or both of people 104, 106 can be varied automatically or manually so as to reach a stimulation goal for one or both people. Particular actions discussed here may also be employed for a single user where appropriate, or may be applied to more than two users and in settings other than those shown here (e.g., provided to two dozen students in a classroom).

In this example, the two people 104, 106 are in a room together, such as a married couple or other roommates—and for purposes of discussing coordinated adjustments for devices of multiple people, they are assumed to spend regular and relatively long periods of time together (e.g., they spend almost every weekday together as school classmates or co-workers, or almost every evening and night together as co-habitants), They are each receiving exciting light from multiple sources—some individual and some common (or mostly common). The individual sources are laptop 108 whose display is shining directly at person 104, and laptop 110 whose display is shining directly at person 110. The system (via a server not shown) may correlate each of laptop 108 and laptop 110 with person 104 and person 106, respectively, via the user previously having registered the particular laptop to their account with the system 100 or a broader system (e.g., to an APPLE or GOOGLE customer account). Other devices (e.g., smartphones, tablets, SAD lights, etc.) may similarly be correlated to each such user by the system 100, so that the system 100 can (as described in more detail below) make an accurate determination of the amount of excitation to which the person has been subjected during a time period.

A television 120 is a second form of electronic device to which the people 104, 106 may be subjected to excitation light. Here, both people 104, 106 are subjected to the same light, though the character of the light changes over time as the content being displayed by the television 120 chances over time. For example, a romantic movie may deliver light that has less of a melanopic effect than does a sporting event. The distance from the television 120 to each of the people 104, 106 is also less predictable than for the laptops 108, 110, so different mechanisms (discussed below in more detail) may be used to determine what share of the light generated by the television 120 reaches the eyes of each of the people 104, 106.

Separately, ceiling lights 118A, 118B are light sources that, like television 120, affect both people 104, 106. But while television 120 has a lighting effect that various essentially constantly with the content it is delivering, ceiling lights 118A, 118B have essentially constant output in terms of brightness, spectrum, and color temperature (unless and until they are adjusted externally by system 100 or turned on/off). The ceiling lights 118A, 118B can be controlled manually and/or automatically from a wall switch 116, and/or can be controlled more locally such as by the use of network-connected light bulbs in ceiling lights 118A, 118B. In some instances, the ceiling lights 118A, 118B may be spaced laterally enough from each other and be low enough relative to the people 104 106 that an appreciable amount of light from each ceiling light 108A, 108B is received by one person but not the other. In such situations, the system 100 may treat each light as a hybrid of a individual light source and a shared light source—e.g., by assuming that most of the excitation of one ceiling light will reach a particular person and some (but a minority) of the excitation of the other ceiling light will. The relative excitation received by each person from each particular light may be estimated by modeling the dimensions of the room and positions of the lights and people, or by measuring received light at each respective laptop (e.g., by pulsing each ceiling light and correlating light sensed by each laptop at the time of each respective pulsing).

Each of the example light sources shown here—whether varying frequently in their output and specific to a particular person 104, 106 (e.g., laptops 108, 110), varying frequently in their output but generally to both people 104, 106 (e.g., television 120), or not varying much but general to both people 104, 106 (e.g., ceiling lights 118A, 118B)—may be controlled by a server system 102. The server system 102 is shown representationally here as a cloud, because it may include or rely on a number of components local to the people 104, 106 and a number of computing components remote from the people 104, 106 at any given point in time, such as one or more rack-mount servers executing one or more virtual machines on behalf of accounts correlated to each of the people 104, 106. Alternatively, or in addition, particular operations described here may be carried out by one of the laptops 108, 110, by a home server or gateway, or by another device local to the people 104, 106—perhaps with additional coordination from remote components. The server system 102 may receive inputs from various activity sensors (e.g., wrist-worn by people 104, 106 or designed to sense interaction with laptops 108, 110), light sensors (e.g., mounted in laptops 108, 110 or in glasses worn by people 104, 106), motion sensors (e.g., in light switch 116, to determine when a room is occupied) and other sensors. The server system 202 may also control the operation of a number of output controls, including by automatically or semi-automatically varying the brightness, spectrum, and color temperature of one or more devices to which the people 104, 106 are subjected over the course of a day or multiple days. An example of the server system 102 is described in more detail with respect to FIG. 2 below.

The particular level of excitation light to which each person 104, 106 is subjected may be determined by direct methods, indirect methods, or both. Direct methods may measure the light itself, such as by placing a light sensor on laptops 108, 110, which is shown schematically by a bump on the top of each laptop display in the figure. Such light sensors may measure the light intensity and/or spectrum and/or color temperature or other factors at the location of the sensor and use those values directly. For example, the sensors on laptops 108, 110 may be used to determine a level of ambient lighting in a room, such as lighting from television 120 and light fixtures 118A, 118B. Where the sensors are on the same side of the device as a display generating lighting output, they may also receive all or some of such lighting, though if they are on the back of a display, they may mostly avoid sensing such light from their own laptop 108, 110.

The determination of lighting values for the people 104, 106 may also be less direct. For example, the light sensors just discussed may provide lighting values for the location of the sensors, and the lighting that is at a person's eyes may be derived from such measured values. For example, the system 100 may assume that a person's eyes are a predetermined distance from the laptop display (e.g., a value between 2 feet and 3 feet). The orientation of the television 120 may be assumed to be essentially on a line that extends from the people's eyes through the sensors, and the light fixtures 118A, 118B may be assumed to be above (by about 5 feet) and slightly further in front of the sensors than they are in front of the people's eyes. The basic geometry can then be applied to generate a transform of the lighting values that are sensed at the sensors, so as to determine lighting values at the eyes of the people 104, 106.

The determination of the lighting effect on people 104, 106 may be even more inferential than the previous examples. For example, no light sensors may be used (or none may be available in certain times of a person's day whereas they might be available other times, and different approaches described here may be used in those different times), and instead the general lighting parameters delivered by different devices can be inferred from general characteristics known to belong to those devices. For example, the brightness and color temperature of bulbs for light fixtures 118, 118B may be known for various input values provided to them. As one example, a manufacturer may publish such values, or third parties may test and observe examples of a product and may publish their observations of the products so that parameter values from such observations may be used by system 100 and server system 102 in determining the lighting contribution of such devices to the excitation light levels to which each of people 104, 106 are subjected. The system 100 may then determine what types of devices a person is being subjected to in any given situation, may access stored data that indicates the lighting parameters for light generated by those devices, may optionally apply a transform to account for the distance of a person's eyes from a device and/or the geometry (e.g., angle from line of sight, offset from person's center-line, and distance in front of and above person's eyes) to provide a transform to adjust the light parameters generated by the device so as to better reflect the parameters as they hit the person's eyes. For devices that change in their lighting characteristics frequently, such as video displays, the system 100 may also identify the lighting characteristics for the content rendered by the display over time, such as by obtaining information of a graphics processing subsystem for an electronic device that renders video (e.g., a streaming video, stored movie, etc.).

The sensing and control connections are shown schematically in FIG. 1 with dashed lines generally running directly between server system 102 and each of the relevant electronic devices. In actual implementation, the connections can be wired, wireless, or a combination of the two. Also, the control may be implemented at varying degrees at various levels in the system 100. For example, one of the laptops 108, 110 may take on one of more control operations described herein as being performed by server system 102. Or a home automation hub or other form of home server may take on one or more of the operations, and may be separate from the devices shown in FIG. 1 or may be integrated with one or more of the devices. Also, particular ones of the devices may include processing and/or storage to perform operations that could otherwise be performed by server system 102 or other components in the system, such as memory that stores lighting parameters that characterize the level of excitation lighting generated by the device—e.g., so that the particular device can be queried and can respond with one or more values that indicate the intensity, spectrum, and color temperature (or other parameters) of the device at the current time, or over a defined period of time (e.g., the prior 1 second, 1 minute, 10 minutes, or 1 hour).

The closed-loop control of the system 100, as noted, may occur by a controller such as server system 102 obtaining sensor data; identifying a goal to be reached for one or more of the people 104, 106 (e.g., using previously-stored data); identifying changes (if any) that need to be made to the lighting being provided to either of the people 104, 106; and generating control data that causes such changes to be made. One such identified goal may be to better align the sleep/wake cycles of the two people 104, 106 (by reducing differences in the phases offsets of the sleep/wake cycles of the people)—where the goal may be identified automatically by system 100 determining that the people 104, 106 sleep frequently at the same location and have roughly similar sleep/wake cycles (i.e., one is not on day shift and the other on night shift for work). Such a goal may be identified manually by each of people 104, 106 interacting with an application that allows them to specify goals they would like to achieve (e.g. preferred sleep and wake times), and to potentially identify other users (e.g., by providing an email address or other credential for the other person's account with the system 100).

Shown schematically in FIG. 1 are sleep cycles 112, 114, for each of people 104, 106. The sleep cycles 112, 114 are shown as sine waves, where positive values would be natural wake times for a person and negative values would be natural sleep times. Of course, actual patterns are much more complex (e.g., with potential times for napping in the middle of an awake time, and with more sudden changes in sleep/wake rather than a smooth sine function). As indicated by dots on the graphs showing the current status of each person 104, 106, the status of person 106 is that she is about to start falling asleep (her dot is approaching the transition from positive to negative), while the status of person 104 is that she still has some time (perhaps 2 hours) until she starts falling asleep. In such a situation, one or both of the users may have indicated to the system 100 (e.g., using an application on their respective laptops or an app on another device that is registered to the same user account as the relevant laptop) that their goal is to better synchronize their sleep/wake cycles. This might involve adjusting the visual excitation provided to person 104 if she requested the synchronizing, to person 106 if she requested it, or to both people 104, 106—e.g., to push just one user all the way toward the other, or to push each user part of the way toward the other.

For example, and as described in more detail below, the server system 102 may be programmed to correlate particular changes in brightness and color temperature by particular devices (e.g., smartphone and other small-display computing devices, laptops and other larger-display computing device, whole-room televisions, ambient lighting, and natural lighting both indoors and outdoors). For person 104, then, the server system may take actions to advance her sleep schedule, such as by dimming light fixtures 118A, 118B and television 120, while shifting the color temperature of laptop 108 toward the red end of the spectrum. In coordination, the server system 102 may take actions to delay the sleep schedule of person 106, such as by shifting the display of laptop 110 toward the blue end of the spectrum so as to at least partially counteract the changes made to the light fixtures 118A, 118B and the television 120.

The particular levels of change in brightness of particular devices and/or color temperature and/or spectrum and/or timing and duration of changes may be based on a variety of factors discussed above. The particular values may be generated by applying a formula that reflects the weight of each constituent factor that is believed to affect how a particular user will react to "coaching" of their internal clock by the mechanisms discussed here. In other examples, particular values may be obtained by using one or more look-up tables that take values of various factors as inputs, and provide as outputs values that can be used in other look-up tables, in a further formula, or as the ultimate value for a control parameter like brightness, color temperature, timing, and duration. In addition, such identification of operational parameters may take into account the full effect of all light sources to which each person 104, 106 is subjected—where each may be weighted to reflect how much of an effect a change in values for a particular device will affect each person 104, 106. The computed values may also take into account certain limits, such as a maximum comfortable brightness, maximum range of color temperatures, or maximum increase in brightness for light pulses—so as to maintain the system 100 in operation at a level that does not annoy the people 104, 106. For example, for ceiling lights, a luminance above 10,000 cd/m^2 may be considered excessive. For general scenes, a maximum allowed luminance contrast of 1000:1 may be applied.

Such changes in the operation of devices whose light the people 104, 106 are subject to may be made progressively over a number of consecutive days. For example, the system 100 can push person 104 in an advancing direction and person 106 in a delaying direction by 10 minutes a first day, approximately 10 minutes a second day, and additional amounts until the schedules of both people 104, 106 align with each other. The day-to-day changes that result from operation of the system 100 may also be monitored by the server system 102 so as to determine how each person 104, 106 is reacting, and subsequent efforts toward achieving a goal may be adjusted to reflect such progress. For example, if large steps are made toward aligning the people 104, 106 in a first couple days, the efforts may be reduced in later days so that the people 104, 106 have a "soft landing" and do not overshoot each other. In addition, the progress of each user toward a predetermined goal may be initially estimated and then may be periodically checked, so that the operating parameters of various devices may be altered from what they would have been when the process was first started, and if such alteration would be too extreme, the relevant person 104 106 could be informed by the system 100 that they will not be able to achieve the desired level of coordination by the initially-computed time.

To determine the effect that circadian rhythm is having on a person after the process to adjust a user's activity begins, dim light melatonin onset (DLMO) may be determined each day leading up to sleep time (typically in the evening). Alternatively sleep and/or wake times for a person over multiple days may be determined, and other inputs that affect such times may be removed. For example, an activity monitor may be used to determine that a person exercised immediately before their "normal" sleep time, and the fact that the person's sleep time on that day was delayed may be assigned to that activity, and not interpreted as something related to circadian cycles. Similarly, a user's food or drink input may be monitored (e.g., by a "smart" coffee maker or a smartphone application by which a person tracks such input), so that delayed sleep by caffeine ingestion can be assigned as a cause for a delayed sleep time on a particular day, rather than some change in circadian rhythm. The remaining differences in a user's cycle over time may then be attributed to the process's effect on circadian rhythm.

In certain instances, one or more devices for a particular person may be over-driven, typically to keep the person awake longer and retard the person's wake/sleep schedule. As discussed here, over-driving is providing output from a device—typically a smartphone or other personal computer—that exceeds the stimulating light that would be generated by the device in the absence of an application directed to affecting non-visual stimulation. For example, a laptop computer may take on a particular brightness that is previously determined to be pleasing for users, given an input from a light sensor (e.g., where a display will dim for a user when the user is in a dark room as compared to a bright room). Over-driving such a device would involve forcing the device to a higher brightness than its "stock" brightness for a given user brightness setting—for example, not lowering the brightness when the user enters a dark room, or lowering it a substantial amount less than it would be lowered without application to non-visual responses.

As also noted herein, actions like over-driving a device, providing pulses, and other actions to affect a user may be performed for a single user, for multiple users individually, or, for multiple users in coordination. The firmer may involve simply determining that a user should be shifted based on a goal the user has helped identify (e.g., the user provides a preferred bed time, or a time of day they most need to be alert), and actions are taken to achieve that goal. In the middle example, such steps may be taken simultaneously, such as through a cloud-based server system, for many users who each have their own current parameters (e.g., awake/sleep parameters) and goals. For the latter, a couple who lives together or a group that works together or has educational classes together may enroll together and set a common group goal (e.g., a coordinated bed time or a coordinated alert time).

In other examples, one or more devices that subject people 104, 106 to stimulating light may be pulsed to have a non-visual (circadian) effect on the people 104, 106. Where multiple people are being coordinated, pulsing may be provided to only a subset of the multiple people (e.g., one person of a couple or a defined plurality of people within a large plurality in a group) For example, the brightness of a device may be increased a certain percentage (e.g., 30% or more) from its otherwise-normal intensity for a short period (e.g., less that a second, less than 2 seconds, less than 5 seconds, or less than 10 seconds). The pulsing may then be repeated periodically during a time period when it is desired to affect the person's circadian timing.

The pulses may also be longer in time. For example, lighting can be scheduled to change once every hour or two hours throughout a period of shift work as differences in PRCs permit. Also, when energy savings is critical, 10, 15, or 30-minute pulses could be scheduled to occur for a portion of each 60-120 minutes. In certain examples, pulses of light will use 3-20× as much light as a typical task should require, so that a room lit by 50-300 melanopic-equivalent lux (as offices and classrooms are typically) may have pulses of 250 and up to 5000 melanopic-equivalent lux periodically, with the top end of the range approximating the exposures seen outdoors. The lighting pulses may also be schedule for a particular person or persons at a time of day or time in their cycle when pulses are known to have a higher-than-normal effect on their cycles. In one example, each person's cycle may be divided into 24 equal segments (one hour each), and the output of that person's associated light-generating devices may be provided different setting based on which segment the person is in.

As also discussed herein, transitions of devices from one mode to a subsequent mode—e.g., brightening a television or laptop display, changing a color temperature or spectrum of a display—may involve a smooth interpolation so that an average user does not consciously recognize that the change has occurred. For example, a transition may taken place over a period of one minute, one to two minutes, two to three minutes, three to four minutes, five to ten minutes, ten to fifteen minutes, fifteen to twenty minutes, or twenty to thirty minutes, or a range that is the first value of one of the just-mentioned to the second value of one of the just-mentioned ranges (e.g., two to twenty minutes).

The server system 102 may also generate messages and reports for the people 104, 106. The messages may, for example, be provided to the people 104, 106 automatically when the server system 102 determines that a lighting change needs to be made for one or both people 104, 106, and may send a notification to the laptop 108, 110 or smartphone of the particular user with text that explains the change that is about to be made, and optionally with a prompt for the person to approve or disapprove the change. The user might disapprove a color temperature change, for example, if the user is presently in a photo editing application or other application that requires true color. Reports may show person 104 or person 106 what changes the system 100 has made to the various devices around the relevant person, and the sleep/wake cycles for that person, along with textual explanations that tell the person how their sleep has been affected and/or what additional changes (whether manually by the user, such as exercise or diet, or automatically by the system 100) could be made to get closer to the identified goal for the particular person.

In this manner then, system 100 may provide a mechanism by which a goal may be identified relating to the type and severity of light that a person undergoes, which may be specific to that particular person or involve that person in relation to one or more other people. Users may be provided with information about how the system 100 is operating so that they can determine whether the system 100 is having any effect, and they can adjust their goals accordingly. The system 100 may thus allow a person to benefit in various manners such as reducing eye strain, lessening time spent awake when they would prefer to be sleeping, and being forced into a sleep/wake cycle that does not match that of the person or people they spend the most time with.

Figure 2:
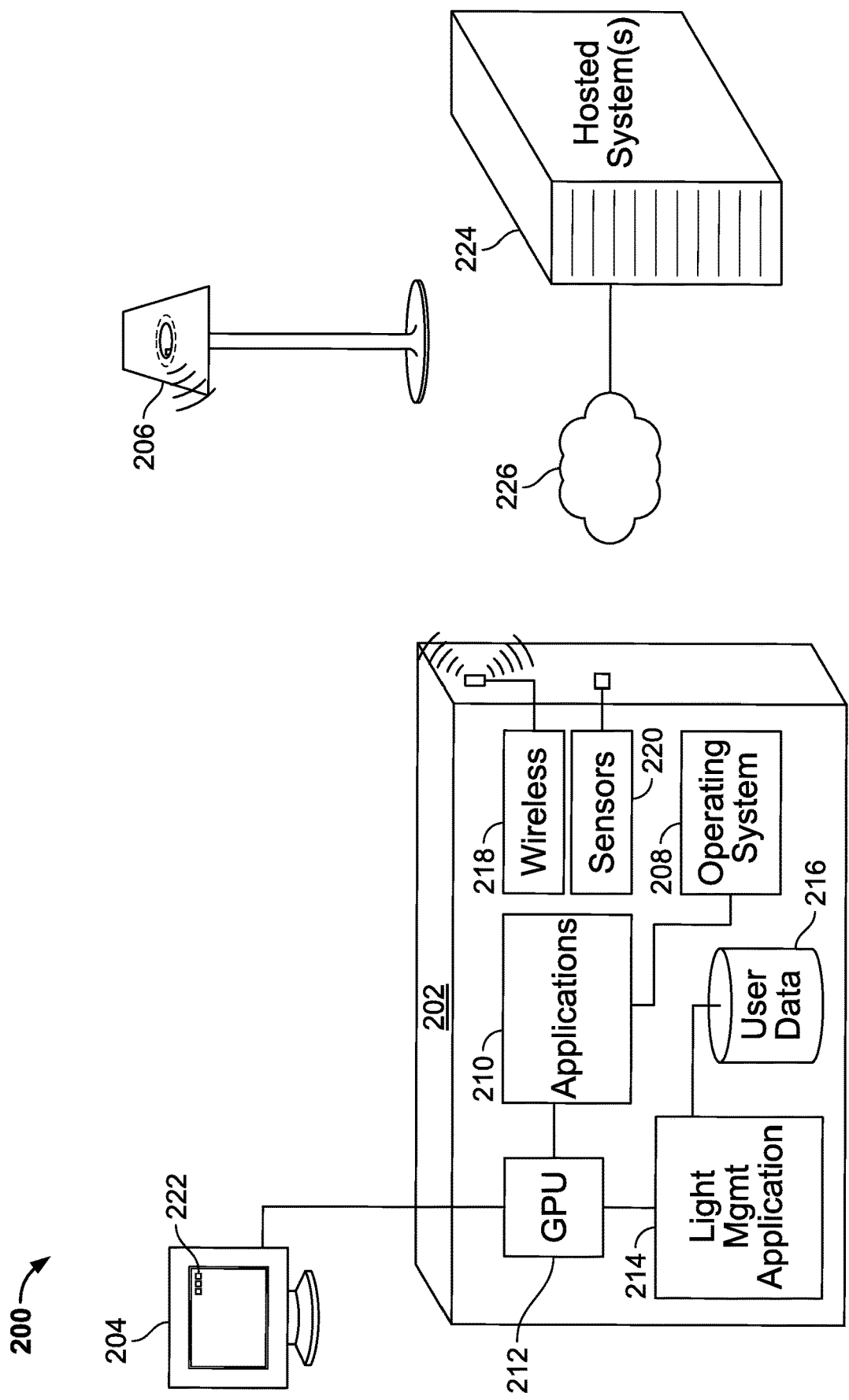
FIG. 2 is a block diagram of a system for controlling stimulating light that various light-generating appliances provide to various people.

FIG. 2 is a block diagram of a system 200 for controlling stimulating light that various light-generating appliances provide to various people. In general, the system 200 may be implemented in a context like that of system 100 in FIG. 1 and may perform the operations of such a system described above. The system 200 generally includes a computing system that receives inputs relating to users' past and present lighting situations and activities, and generates information for controlling electronic devices so as to improve future activity for the users, such as by changing the intensity and color temperature of lighting devices that are determined to be in the vicinity of particular users.

The system 200 here includes a computer 202 that may take a variety of forms, such as a tablet, laptop, or server computer. The computer 202 is tasked in this example with identifying a lighting-related goal for a user or users, determine changes in electronic devices around the user that will better achieve that goal, and generating information for causing such changes to take effect. As one example, the computer 202 may determine that the user is not alert enough during certain times of the day, may identify changes to prevent such lack of attention such as providing the user with light from the blue end of the color temperature spectrum leading up to a time of day when the user has previously been inattentive, and causing devices around the user to shift toward the blue end during that time period.

An operating system executing on the computer 202 manages the various operations of the computer 202, including the operation of a microprocessor and GPU 212, and the ability of applications 210 to be loaded and to execute on the computer 202, and also to interact with external resources like a display 204, communication interfaces (e.g., to provide data to and receive data from the Internet), and other components. The operating system may in particular provide drivers for components such as the display 204, and among other things, can store and provide data for identifying characteristics of the display 204, such as the make/model of the display 204, so that, as appropriate, parameters of the display 204 or other components can be determined, such as to determine the amount of visual stimulation that the display 204 provides under particular scenarios.

Also in computer 202, one or more applications 210 are loaded to effect the sorts of operations discussed above and below. Such applications 210 may run in the background and not normally be visible while they interact with a graphics processing system and obtain data from outside computer 202, such as to determine a goal from a hosted system 224 over network 226, and then to make lighting changes on the computer 202 to achieve that goal if it is determined that computer 202 is currently being employed by the user. In different implementations, particular levels of coordination between the devices, such as identification of goals for a person or people and determining modifications for device operating parameters needed to achieve those goals, can be carried out in a device that generates light for the user, in another device local to that device (e.g., on the same LAN), or by a remote device (e.g., a remote cloud-based virtual server system).

The applications 210 may obtain inputs from the hosted systems 224, by user input to computer 202 itself (where such data may be stored on computer 202 or hosted system 224 for later use), and from sensors 220 which may include appropriate interfaces to convert data obtained by the sensors 220 to a usable form. The sensors may include motion sensors, temperature sensors, and light sensors, among others. In some examples, the sensors may be separate from computer 202, such as by being in a wearable wristband or as part of a bed that the person regularly uses.

Communication by the computer 202 to other devices may be through an interface such as wireless interface 218. Such communication may involve the computer 202 obtaining various forms of data that it needs both locally and remotely, and providing control signals to other devices such as lamp 206. In this example, lamp 206 may, through a smart bulb installed in lamp 206, both provide data, such as data that describes the current intensity and color temperature of the lamp and may receive data such as control signals from computer 202 instructing lamp 206 to change its intensity and/or color temperature—e.g., to better effect a goal for a user that is determined to be sitting in a room where lamp 206 is located.

The applications 210 may also have access to a graphics processing unit (GPU) 212 on the computer 202 and may use such access to identify the characteristics of the light that has been and is being displayed on a display 204 of the computer 202, and to control the characteristics of what is to be displayed. For example, the applications 210 may obtain data from the GPU 212 that indicates that a certain brightness level and color temperature has been displayed as a user employs business software or watches a movie on computer 202, so that applications 210 can compute a total amount of visual excitation a user of computer 202 has received. The applications 210 may then make determinations about changes that should be made, and may provide control data to the GPU 212 to make the changes occur, such as by causing the GPU or another component to change the color temperature of a display 204 for the computer 202.

The applications 210 may include a light management application 214 that performs such determinations and generates such control data. In addition to relying on data obtained from sensors 220, or external sources such as lamp 206 and hosted system 224, light management application 214 may manage its own user data 216. Such data may include data that characterizes user's wake/sleep patterns over a long period of time, the receptiveness of the user to particular changes, the schedule for the user (e.g., they sleep or prefer to sleep different hours during the week than on weekends, or they recently returned from a trip to a different time zone), etc.

In like manner, light management application 214 may be one of the applications executed by microprocessor 210 and may adjust one or more parameters of display 204 in order to control the level of stimulating light that a user of computer 202 receives from display 204 (and potentially from other sources external to computer 202). Light management application 214 may have a variety of goals, including to lessen the amount of visual stimulation a user receives later in a day, so as to reduce interference with the user's natural sleep patterns from being exposed to light from display 204—including as part of an overall program to coordinate changes as between and among multiple people.

Light management application 214 may be provided with data about a model that explains how display 204 delivers light to a user, data that indicates past exposure of the user to light (e.g., how long the user has been using computer 204 and other devices in the last X hours), data about other light sources that have been faced by or are being faced by the user, and other information. The various pieces of data may be obtained from third-party sources, as discussed below, such as via wireless interface 216, which may make a data connection to local appliances to obtain information about their delivery of light to the user, and to one or more networks such as the internet, so as to obtain other relevant data, and via sensors 220.

The light management application 214 can affect the output of display 204 by sending commands to the GPU 212 (and to components that control other light-generating appliances in the area of a relevant user) through an appropriate application programming interface (API). For example, the light management application 214 may use the operating system 208 to send commands to the GPU 212 to cause it to change the overall color temperature of content that is sent to the GPU 212 and provided for display 204, where the GPU 212 may implement a discrete shift in color temperature as compared to what it was doing before receiving the commands. As one example, the OpenGL API may be implemented by the GPU 212, and control of the overall color temperature (and adjustments to meet changes in overall color temperature) can be made by providing appropriate inputs for system color calibration controls, pixel shaders or other compositor-enabled techniques, or backlight controls (which may include color, e.g., for RGB/OLED or multi-spectral displays). The appropriate mechanisms for causing adjustments in overall color temperature may differ from device-to-device and can be selected from among multiple possible techniques in response to determining a make and model for the device (e.g., via acquiring a device ID) and by providing appropriate parameters and/or software to execute on a particular device to carry out the adjustments.

The light management application 214 may take into account data generated both internal to computer 202 and external to computer 202, in determining one or more parameters to change via GPU 212. For internal data, light management application 214 may obtain data from user data database 216, such as data that indicates user preferences for display 204 (e.g., preferred brightness and color temperature settings, colors to be used for windows and other display elements as part of a profile, etc.); data from histograms of screen data, either the current state or an average over a time interval; data that indicates a history of use by the user so as to enable computation of a total amount of stimulating light received by the user; and other similar data.

The internal data may also include data generated by sensors 220 either at the behest of light management application 214 or another application, such as light sensor readings to determine the level of ambient light a user is being subjected to, orientation of the computer 202 and motion of the computer 202 to determine whether the user is holding the computer 202 (e.g., perhaps close to their face) or instead that the computer is resting on a desktop (e.g., and thus perhaps farther from the user's face so that the user is receiving less stimulating light).

Other external data may be obtained via interface 216, such as from third-party data providers 224 via a network such as the Internet 226. For example, certain of the user data may be stored "in the cloud" and accessed by computer 202 from there. Also, data not easily obtainable directly by computer 202 may be obtained, including maps data that may indicate whether a building is present at the computer's current geographic location (so that ambient light would be adjusted accordingly by light management application 214), weather data to indicate likely ambient outdoor light levels at a particular geographic location and at a particular date and time (so as to determine the amount and nature of natural light the user is receiving), modeling information that indicates stimulating light levels provided by various makes and models of displays, and other such data.

The display 204 may, in addition to providing the display of information from other applications, also (via commands from light management application 214) provide data directly to a user in the management of the light management application 214. For example, a text box 222 may pop up on display 204 to tell a user that the computer 202 would like to make adjustments in the light characteristics of the display 204, and may seek confirmation from the user that such changes are acceptable.

In another example, the computer 202 may serve to compute an accumulation of visual stimulation for a user over the course of a particular time period, such as over the course of a day or over the course of a predefined number of hours before the user's scheduled time to go to bed. In particular, the computer 202 may integrate natural light, artificial ambient light, and artificial point light using a response function weighted by the time the user received light over the course of a day. For example, the computer 202 or another device or devices that accompany the user during a day can measure light received by a user or can infer such light. Measurement can be determined using a light sensor on a device that the user carries, whereas inference may be made by determining a user's immediate ambient environment (e.g., inside or outside) via sound measurement or comparison of the user's location to maps and satellite data that indicates the presence of buildings and/or plant cover at the user's particular geographic location. Assumptions may be made, for example, about typical office lighting levels and types if the user is determined to have spent part of her day in an office building.

Figure 3A:
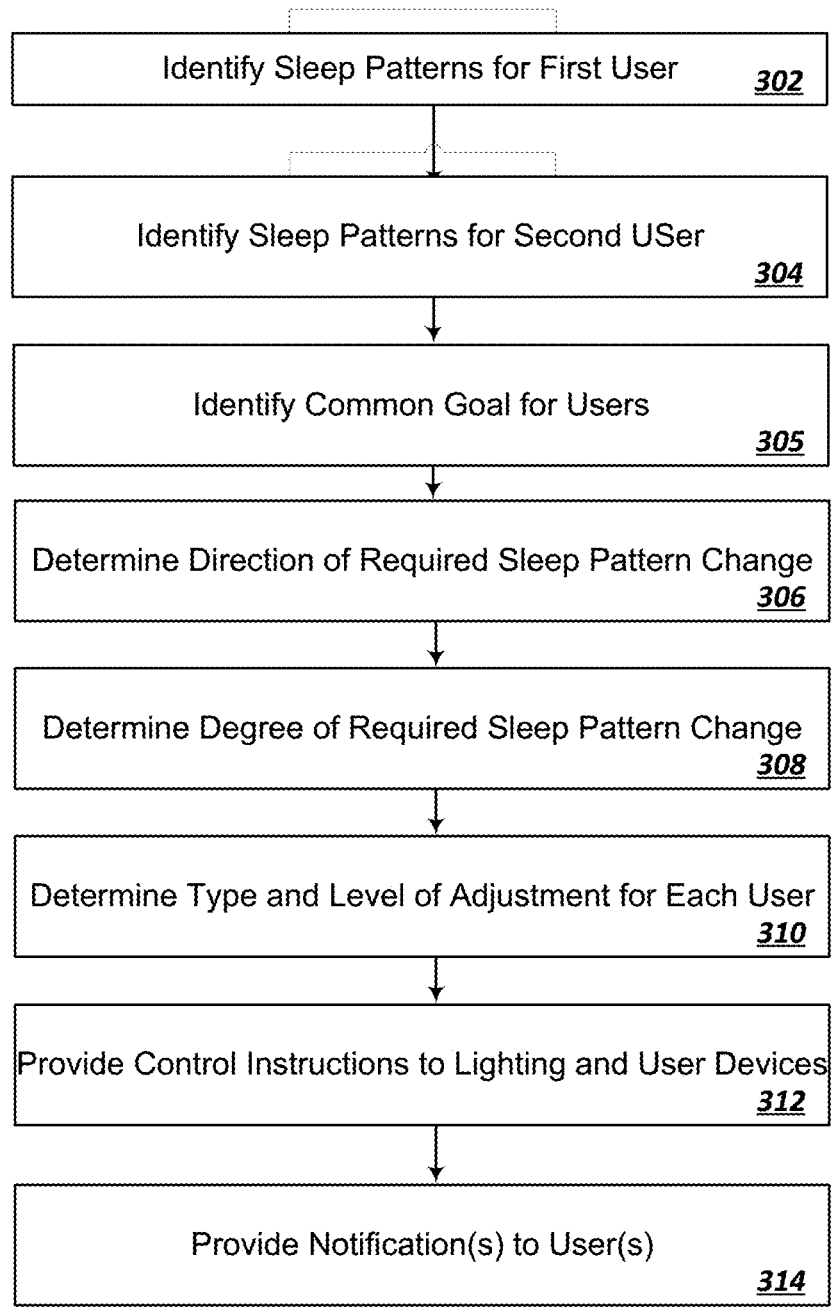
FIG. 3A is a flow diagram showing an example process for coordinated adjustment of artificial light generation for multiple people.

FIG. 3A is a flow diagram showing an example process for coordinated adjustment of artificial light generation for multiple people. The process may be carried out, for example, using systems such as system 100 in FIG. 1 and system 200 in FIG. 2. In general, the process involves identifying that multiple users interact frequently, identifying a goal to achieve as between and among the users that can be affected by the characteristics of light provided to the users, determining the types of changes that should be made, and causing those changes to be made—with the potential for looping back to make changes to the settings that were initially determined so as to take into account observations after the initial time (e.g., because one person is not reacting as expected) or unforeseeable activities after the initial time (e.g., a person's trip to a very different time zone). The changes may be applied repeatedly, such as each day at a particular time of day, so as to maintain or further come closer to achieving the identified goal.

The process begins at box 302, where sleep patterns for a first user are determined. Such a step may occur after the first user and a second user have been identified. Such initial identification may occur by one of the users employing a computer application that is directed to making lighting adjustments, and identifying themselves and the second user as subjects of such adjustment (e.g., by providing an email address, telephone number, or other identifier for the other user, and providing credentials for themselves such as by logging into a system that is specific for such adjustment or that carries out a number of different services for the forst user).

Such sleep patterns may be identified by questioning the user (e.g., asking when they typically wake and sleep on weekdays/nights and weekends/nights), by looking to data captured by an activity tracker for the first user (e.g., a wrist-worn fitness band), by obtaining data from a smartbed that the user is associated with, or by other appropriate mechanisms. At box 304, prior sleep patterns of the second user are identified, such as in the manners just discussed for the first user.

Other existing circadian cycle parameters for a person or persons may also be determined. For example, parameters for a particular user can also include, in addition to habitual or recent sleep/wake times, recent light history for each user, recent time of food and exercise for each user, age of each user, gender indicators for each user (e.g., testosterone or estrogen levels), DLMO timing for each user, and population statistics about circadian phase.

At box 305, a common goal to be achieved for the users is identified. At box 306, where the goal to be achieved has been identified as the closer alignment of sleep patterns for the two user, a direction of the change may be determined. For example, if a first user typically falls asleep at 11 p.m. and the second user typically falls asleep at around midnight (and the goal is to reach a common sleep time between those points), the direction would be to retard the sleep of the first user and/or advance the sleep of the second user. Other goals may also be identified, such as by giving the first user a list of goals and receiving a selection by the user of a member of the list. Such other goals may include goals for a single user or multiple users in coordination, such as having a user or users alert at a certain time of day (e.g., when a test is typically administered or when a challenging part of a job occurs). Other goals can include optimizing performance for rotating shift-work, including being alert during the drive home from a shift.

The process at box 308 then determines a degree of the required change. In the prior example, the degree is approximately one hour. The system at this point may determine whether the change is achievable, where a one-hour change might be readily achievable (e.g., through 30 minutes for each user, or 15 minutes for one user and 45 minutes for the other), but if the two users are on separate shifts (or one has been traveling in a distant time zone), their patterns may currently be eight hours apart, and the process may generate a message to the particular user to confirm that they truly want to try to align their sleep patterns, and warning that such activity may take some amount of time to achieve in a best manner.

In certain instances, the process may require asymmetric or highly asymmetric changes for one user relative to another (e.g., a five minute shift later in bed time for one and a twenty minute shift earlier for another). In such situations, as described elsewhere, particular strategies may be used, particularly for the person who needs to be affected more strongly. Such a user may be provided with over-driven light, pulsed light, and light effects provided at a time of day determined to have a maximum effect toward the desired goal.

At box 310, the process determines the type or types of adjustments to be made, and the level of those adjustments. The type of adjustments may include characteristics that include intensity of light generation by a device and its color temperature (over a long period, or over pulses of several minutes followed by lower light levels for the next 1-2 hours, and a different chosen level for the next epoch), and may also include which devices to adjust so as to obtain the goal. Example schedules may change the lighting level once per hour or per 90 minutes, with optimizations to use shorter pulses in a portion of each epoch to optimize energy usage. Other characteristics that may be changed include spectrum or color temperature by which a display is lit, and bias lighting attached to the display, which can reduce contrast and make higher lighting levels more acceptable.

Such determinations may be made multiple times, such as once when a period of adjustment begins (e.g., at a predetermined number of minutes or hours before a desired sleeping time begins) and again at periodic times thereafter, or when the setting of a user has been determined to have changed (e.g., by using motion sensors and/or location sensors such as GPS to determine that a user has entered or left a room that has smart lighting that can be controlled by the process, or by determining that a particular device such as a television that has previously been associated with the user by a central control system, has been turned on or off). For example, where a user has turned off her laptop computer, the process may identify such an event as occurring, thus triggering a re-computation of settings that will now be required to meet a particular goal, such as by changing ambient light levels or television settings in a room where the user is determined to be located. In another example, an activity sensor may determine that the user obtained a particular type of exercise, and may adjust lighting or other aspects of electronic devices around a user so as to maintain a goal that may have been upset by the exercise. Updates may also be made if the user indicates that she is ill and requires more rest (time with the lights off), or would like to go to sleep earlier or later than normal for the particular day, and settings may be recomputed in response to such an input from a user (e.g., made into her tablet, laptop, phone, or watch).

Such user-effect may be provided at an optimum time of day for each person. For example, certain effects lessen in the middle of a day, so that a person who does not need to change their cycle as much as another may be driven by the process at that time of day. A person who needs to be driven more by the process may have their light or other factors affected at a time of day when the result will be relatively larger. As such, the process can determine at least one time when the changes in artificial lighting provided to a first user have a substantially different magnitude on the first user than the changes in artificial lighting provided to a second user have on the second user, and can provide instructions to the users or devices of the users for a time or times that correspond to that determined time (e.g., which may be a different time for each user or the same time for both users).

At box 312, the process provides control instructions to lighting and other user devices. For example, the smart light bulbs, the GPU, and the other devices around a user may operate according to application programming interfaces (APIs) or similar mechanisms whose details are published to allow outside users to interact with the devices in useful manners. A processor executing a light control application may thus be programmed to operate according to those APIs and may send commands to the various devices to affect their light-generating characteristics, such as by sending a control value that corresponds to a particular intensity and/or color temperature for the particular device as laid out in its corresponding API. The controlled values may be changed over time, and may also be updated if the context for the user changes, such as in the manners discussed above.

At box 314, a notification is provided to the user. The notification may be provided before or after the change is made, or while the change is being made if the change is programmed to occur over time so as to create a more pleasing slow transition (e.g., a transition over more than 5 seconds, 15 seconds, 30 seconds, 1 minute, or 5 minutes). Where the notification is provided before the change occurs, it may also be provided with an option for the user to approve or disapprove the change. Where the user disapproves the change, she may be immediately prompted with a request regarding whether she can be periodically reminded (e.g., next in 30 minutes) or to provide a time when the change can occur (whether in the form of a number of minutes from the current time or expressed as a clock time-of-day). For example, a user may be using a photo editing application for which lighting and color temperature are important, and may decline to have those settings changed until she is done with that application. In other examples, the system may automatically decline to make changes, and may provide a notification to the user that such changes would be made but for the fact that she is using an application that has been identified as one that is generally incompatible with such changes (e.g., a photo editing application).

Steps in the process just discussed can be repeated and can be adjusted for different cycles of a looping process. For example, a goal may be identified once, and the changes for a user's devices can be employed each day around the same time over a number of days or weeks until the goal is achieved or significant progress is made toward the goal.

The process can also be carried out in parallel for multiple users, such as in other manners discussed above. For example, a common coordinated goal may be identified (e.g., a common bed time for two users), and settings for electronic devices around each of them may be adjusted, to the extent practical, to achieve that goal within a reasonable number of days. Different changes may be achieved for each such user either because the user has been determined to react to light changes in a particular manner (e.g., because of the user's gender, genetic make-up, or other factors) or by making user-specific changes to a user-specific device (e.g., a laptop) even when more general changes cannot be user-specific (e.g., ambient lighting for two users in the same room).

Each of the multiple users who are trying to achieve a common goal may receive pop-up notifications or more detailed information about how they are progressing toward the goal—i.e., more general feedback as compared to notification they may receive each time the process plans to change their system settings for them. For example, each day, each such user may be provided with a pop-up or other notification that tells them the percent of their difference in sleep patterns they have closed since beginning the process described here (e.g., as a textual percent or as a graph showing progress over each day). In other example, graphs may be provided that show such progress of each user toward a coordinated goal, along with advice that can aid each user in better reaching the goal, or in other ways that assist the users each in living a healthier life.

By this process and the systems and techniques describe above, then, one or more users may identify, or have identified for them, a goal that can be better effected by adjusting the character of light that they receive each day and over the course of multiple days. The change that each user needs to achieve in order to meet that goal can be identified, and then settings for each of the devices that affect each such user may be adjusted so as to best reach the goal (where the goal may be the entire goal desired by each user, or that portion of the desired goal that is practically achievable through adjustments made to light-generating devices).

Figure 3B:
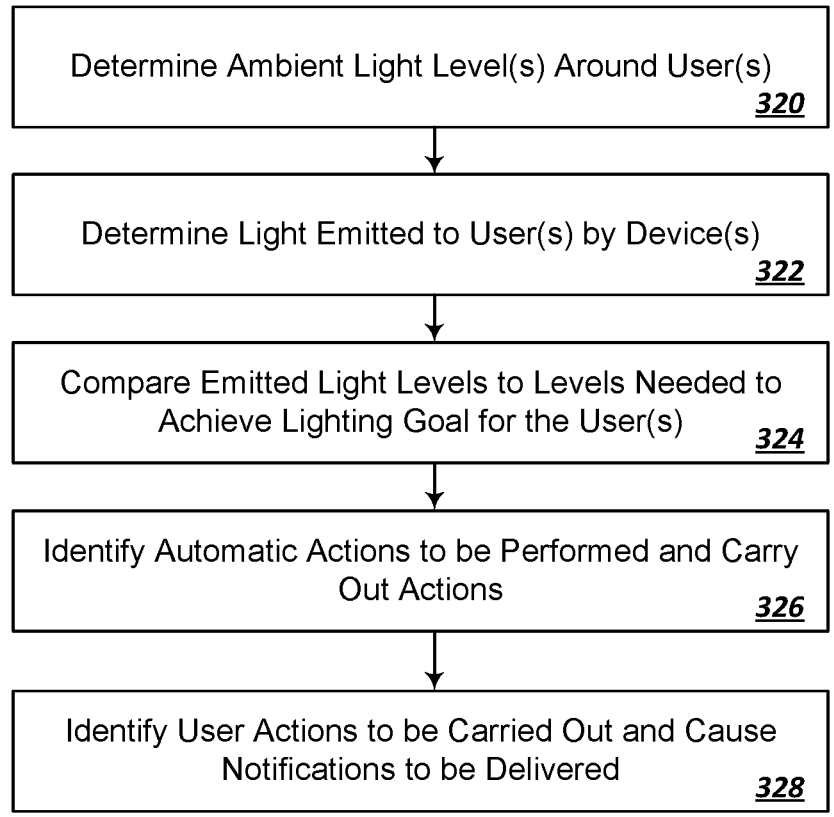
FIG. 3B is a flow diagram showing an example for notifications provided to users of electronic devices concerned their lighting.

FIG. 3B is a flow diagram showing an example for notifications provided to users of electronic devices concerned their lighting. The process may be carried out, for example, using systems such as system 100 in FIG. 1 and system 200 in FIG. 2. In general, the process involves a system that can provide lighting-related adjustments for a user of one or more electronic devices, and that can determine changes to be made and notify a user of such devices of the changes that will be made, that could be made, and/or that have been made. Such notifications can also be provided on a user-specific bases to each of a plurality of users who are being guided to a coordinated goal with each other—where each user may receive the same notifications, or each may receive their own specific message.

The process begins at box 320, where ambient light levels around a user are determined. The lights that generate those levels may be natural or artificial, and may be controllable (on/off or also adjustable (dimming or changing color temperature)) or not controllable. The process may also have previously stored historical data about a user and her sleep patterns and other information about her activities (e.g., where, how long, and with what intensity did she perform exercise as determined by an activity monitor having a pulse sensor and perhaps a blood pressure sensor). The determination of the ambient light level may occur via a light sensor located near the user, perhaps with a transform applied to the measured values to better reflect the light for the user (e.g., to reduce the level of light put out by a light source to reflect the amount of the light that reaches a user's eyes). It may additionally involve identifying sources of the ambient light, and interrogating them (e.g., ceiling lights) to determine the characteristics of the light they are currently emitting, including to identify intensity and color temperature for such interrogated devices. Certain adjustments may be applied to such determined output values to reflect a user's location relative to the sources, to reflect materials between the source and the user (e.g., glass or solid shades or covers), and the like.

At box 322, the light emitted by particular devices is determined for the user. Such light is separate from, but additive to, the ambient light, and includes mainly light from personal electronic devices like smartphones and laptop computers. This particular light and general light may be combined to identify a total amount of light that the user has received in the past and/or is presently receiving.

The total emitted light level as determined from the prior steps may then, at box 324, be compared to a light level (e.g., both intensity and color temperature) that is needed in order to achieve a goal for the user. That goal may include, for example, to maximize the user's wakefulness during a certain time prior or to assist the user with falling asleep at a particular time of day. Other goals, and mechanisms for identifying those goals, are discussed in more detail above. Along with determining the goals, an action plan may have been determined that involves, e.g., executing commands at a predetermined time (e.g., four hours before a planned bed time) to help achieve those goals. The triggering of a determination of actions to perform with a system may be by such time-of-day triggering, by periodic checks of various variables (e.g., periodically determining, based on light input and other activity for a user over the course of a day so far, when adjustments for the user need to start being made so as to achieve a goal of a particular sleep time), or by other mechanisms.

At box 326, the process determines automatic actions to perform and can immediately perform those actions or wait until after step 328 to perform the actions. The particular actions may include adjusting the brightness and/or color temperature of one or more devices that are providing light to the user, opening or closing window shades that can permit more or less natural light to reach the user, pulsing light from room lighting or a personal computing device, or other such adjustments. The particular device to adjust, the type of adjustment to make (e.g., brightness, color temperature, or both), and the degree to which the adjustment occurs may all be made to further the achievement of the goal set forth for the user, such as in the manners discussed above for FIG. 3A.

At box 328, the process identifies user actions that need to be carried out and can cause notifications to be delivered so as to trigger those user actions. At a minimum, the adjustments can be automatic and no notification can be provided to the user. At a next level, the adjustments can be made automatically, and a notification can be provided to the user (e.g., via a temporary pop-up box that fades after a short time if the user does not respond to it) that the adjustment is occurring automatically. At another level, the user may be allowed to interact with the notification to reverse the adjustment and stop it from occurring, or to change what sort of adjustment is made (e.g., approving a change in brightness but not in color temperature). At a next level, the adjustments can be held until a user reacts affirmatively to a notification that tells the user the adjustments that will be made—e.g., the adjustment can be held up until the user taps an "okay" icon. If the user does not react or provides a negative input, the adjustments can be skipped. In such a situation, the user can be provided a notification that explains the effect of abandoning the adjustments, such as text of the form: "Failing to adjust your device can result in a lengthening of the time to get to sleep (e.g., estimated to be 23 minutes for you in this situation)."

Figure 3C:
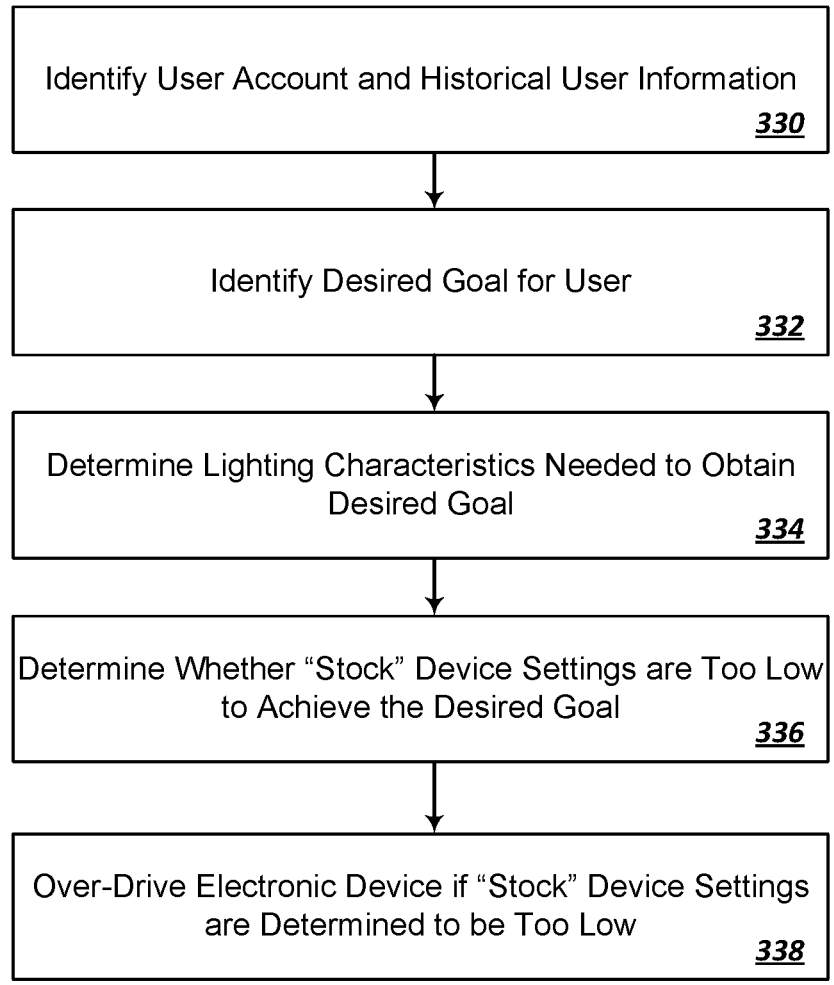
FIG. 3C is a flow diagram showing an example process for over-driving an appliance to provide excessive visual stimulation.

FIG. 3C is a flow diagram showing an example for over-driving visual stimulus provided to a user of an electronic device. The process may be carried out, for example, using systems such as system 100 in FIG. 1 and system 200 in FIG. 2. The process generally involves determining the adjustments that need to be made in the lighting generated by a user's electronic device and making an adjustment that over-drives the device so that it provides more visual excitation to the user than it would in the absence of an application directed toward changing visual excitation to a user so as to affect the user's response—i.e., that is separate from stock adjustments to brightness or other values made solely in response to changes in the brightness of a surrounding room. The process may be part of other processes, like those describe above for FIGS. 3A and 3B, and described in association with FIGS. 1 and 2, and may be used when over-driving is identified as a mechanism for reaching a goal for one or more users in such processes.

The process begins at box 330, where a user account is identified and historical information for the user is obtained from storage that corresponds to that account. For example, a cloud service may track sleeping and physical activity by a user and can save data obtained from worn activity sensors or other sources, in addition to performing initial rounds of analysis on the data (e.g., computing a running average number of hours of sleep for the user over the prior n days, determining sleep patterns or sleep categories into which the user falls based on the historical user data, etc.), and other analysis. Such determinations (and other steps here) may be made for multiple users when the process aims to make adjustments for the lighting received by those multiple users.

At box 332, a goal for the user is identified, such as a goal for keeping the user alert during a certain time period or bringing the user's onset of sleepiness closer to a particular time. The goal may be identified form the user in real time (e.g., the user entering in an input box of a computer application a time of day they want to fall asleep), or accessed from stored data, such as data previously generated and stored when the user or another user identified a goal for the user (e.g., the user's spouse identifying a goal of bringing their sleep and/or wake times closer together, and the user agreeing to that goal, with the system operating the process of coordinating such user input).

At box 334, a determination is made of lighting characteristics needed to reach that goal. Such determination may be made initially and periodically. For example, when a user first sets up such a process, it may be determined that the user's lighting characteristics should start being adjusted at a certain time of the day in order to make the goal achievable, and then the particular setting that is needed may be determined each day at that time (and may be based on the sleep/awake times for the user from the prior 24, 48, 72, or 96 hours, for example, in addition to recent activity tracking data for the user). For example, if the determination is made three hours before the desired sleeping time for a user, the process may determine whether the user is currently using their laptop smartphone or other device, and may use historical data to determine how much the user is likely to use that device over the next three hours. The process may then determine the brightness, or intensity, level of the display on the device and/or the color temperature to be provided with the display on the device over that time period so as to best help the user obtain the goal. Similar determinations may be made for other light-generating devices in the area of the user whose characteristics can be controlled, or that can be taken into account when setting parameters for devices whose characteristics can be controlled (e.g., a user's laptop may take an ambient light reading, and then the process may use that to determine the lighting characteristics of the user's laptop computer).

At box 336, the process determines whether the stock device settings—i.e., the settings that the device would otherwise apply if it were not provided with an add-on application designed to change the brightness and color temperature as a means toward affecting the user response to use of the device after the device has been removed from the user—are too low or too high to achieve the desired effect. For example, it may be that the person desires to go to bed at a time later than the system analysis indicates would be a natural sleeping time for the user. The process may also determine that the natural, stock blue light and brightness from the user's television or laptop computer will not be enough to push the user's sleep time back to the desired sleep time. As a result of making such a determination, at box 338, the process over-drives the electronic device above its stock settings, such as by pushing the brightness higher than the normal stock setting for the ambient light level sensed by the device, or perhaps by shifting the device close to the blue end of the color temperature spectrum as compared to where it would otherwise operate.

In certain circumstances, the process may determine that the desired goal for a user cannot be reliably reached while still maintaining comfortable lighting levels for a user. As one example, where the goal is to make a user fall asleep earlier, their laptop may be dimmed or shifted toward the red end of the color temperature spectrum. But there may be limits that are determined to be "too far" for those settings, compromising acuity or other usability factors, and the process may determine that the goal cannot be met without exceeding those limits. In such a situation, the process may involve informing the user, e.g. via text on the laptop display, of the expected time that can be achieved, and receiving an indication from the user that they are aware of those limits.

In each of these example processes, then, one or more users of electronic devices may be intentionally affected by a system that changes the lighting parameters of light-generating devices around the user or users, with the goal of having an effect on the user(s) that last beyond the user's use of the devices (e.g., after the user leaves a lit room or turns off her laptop). As noted above, the processes discussed here may be performed by various types of systems including system 100 of FIG. 1 and system 200 of FIG. 2, and in combination with other features discussed above.

Figure 4:
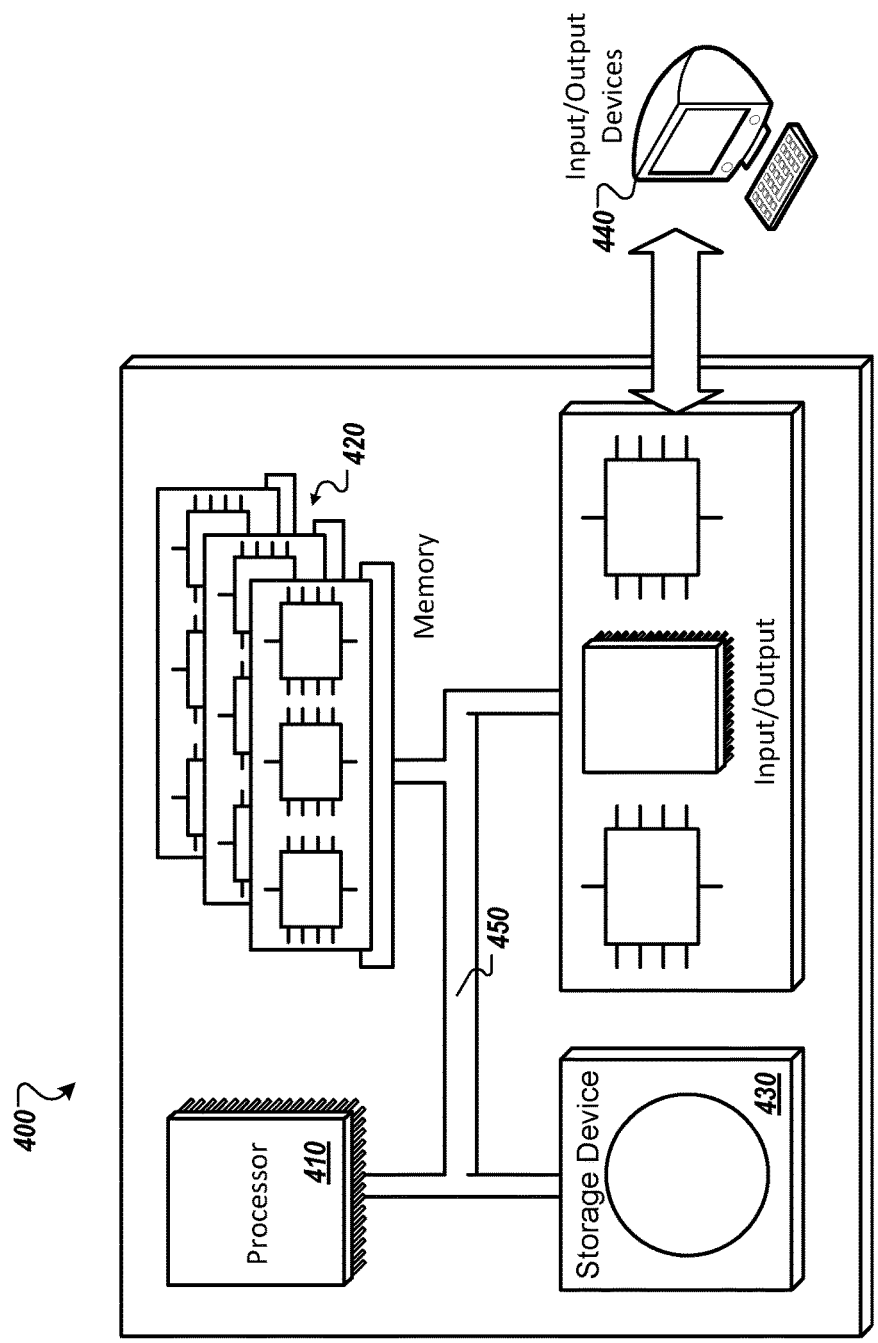
FIG. 4 is a schematic diagram of a computer system.

FIG. 4 is a schematic diagram of a computer system 400. The system 400 can be used to carry out the operations described in association with any of the computer-implemented methods described previously, according to one implementation. The system 400 is intended to include various forms of digital computers, such as laptops, desktops, workstations, personal digital assistants, servers, blade servers, mainframes, and other appropriate computers. The system 400 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. The processor may be designed using any of a number of architectures. For example, the processor 410 may be a CISC (Complex Instruction Set Computers) processor, a RISC (Reduced Instruction Set Computer) processor, or a MISC (Minimal Instruction Set Computer) processor.

In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for controlling display of a light-generating appliance, the method comprising:
    identifying existing circadian cycle parameters for a plurality of electronic device users;
    identifying a common goal regarding circadian cycles for the plurality of electronic device users, wherein the common goal comprises putting the electronic device users in closer alignment of their circadian phases relative to other or others of the plurality of electronic device users;
    determining a circadian cycle adjustment needed for each of the plurality of electronic device users for a response needed in order to meet the common goal, wherein the response for different ones of the users differs from each other; and
    providing instructions to the users or devices of the users, wherein reactions of the users or of the devices to the instructions cause changes in artificial lighting provided to each of the users so as to achieve the common goal.

2. The computer-implemented method of claim 1, further comprising:
    determining a time of day to make the changes for each of the electronic device users, wherein the determined time of day is selected to maximize progress toward the common goal for one or more of the users; and
    providing instructions to the users or devices of the users to carry out the changes at the determined time of day.

3. The computer-implemented method of claim 2, wherein the time of day is a time relative to a wake-sleep cycle of a particular user of the plurality of users.

4. The computer-implemented method of claim 2, wherein the time of day is a clock time.

5. The computer-implemented method of claim 1, wherein the change in artificial lighting comprises a change in a brightness level of a device for a particular user of the plurality of users.

6. The computer-implemented method of claim 1, wherein the change in artificial lighting comprises a change in a color temperature or spectrum of a device for a particular user of the plurality of users.

7. The computer-implemented method of claim 1, wherein the changes in artificial lighting comprise changes in lighting from a personal device for a particular user of the plurality of users, and changes in ambient lighting determined to affect the particular user and one or more others of the plurality of users.

8. The computer-implemented method of claim 1, wherein the changes in artificial lighting provided to each of the plurality of users comprise pulsing the intensity of light provided to at least one of the plurality of users to affect wake/sleep activity of the at least one of the plurality of users.

9. The computer-implemented method of claim 1, further comprising over-driving a device of one of at least one of the plurality of users above what the device would deliver by its stock settings.

10. The computer-implemented method of claim 1, wherein identifying existing circadian cycle parameters for a plurality of electronic device users comprises identifying one or more features selected from the group consisting of habitual sleep/wake times, light history, time of food and exercise, age, gender indicators, dim light melatonin onset timing, and population statistics about circadian phase.

11. The computer-implemented method of claim 1, further comprising:
   determining at least one time when shared changes in artificial lighting provided to a first and second users of the plurality of users affect a circadian cycle of the first user measurably differently than the second user; and
   providing instructions to the first and second users or devices of the users for a time or times that correspond to the determined at least one time.

12. One or more devices having tangible, non-transient computer-readable memory storing instructions, that when executed by one or more processors, perform operations comprising:
   identifying existing circadian cycle parameters for a plurality of electronic device users;
   identifying a common goal regarding circadian cycles for the plurality of electronic device users, wherein the common goal comprises putting the electronic device users in closer alignment of their circadian cycles relative to other or others of the plurality of electronic device users;
   determining a circadian phase adjustment needed for each of the plurality of electronic device users for a response needed in order to meet the common goal, wherein the response for different ones of the users differs from each other; and
   providing instructions to the users or devices of the users, wherein reactions of the users or of the devices to the instructions cause changes in artificial lighting provided to each of the users so as to achieve the common goal, and wherein the changes for each of the users differ from changes caused for one or more of the other users.

13. The one or more devices of claim 12, wherein the operations further comprise:
   determining a time of day to make the changes for each of the electronic device users, wherein the determined time of day is selected to maximize progress toward the common goal for one or more of the users; and
   providing instructions to the users or devices of the users to carry out the changes at the determined time of day.

14. The one or more devices of claim 12, wherein the changes in artificial lighting comprise changes in lighting from a personal device for a particular user, and changes in ambient lighting determined to affect the particular user and one or more others of the electronic device users.

15. The one or more devices of claim 12, wherein the changes in artificial lighting provided to each of the users comprise pulsing the intensity of light provided to at least one of the users to affect wake/sleep activity of at least one of the users.

16. The one or more devices of claim 12, further comprising over-driving a device of one of at least one of the users above what the device would deliver by its stock settings.

17. A computer-implemented method of lighting control, the method comprising:
   identifying a group of people according to a relationship between or among the people that indicates the people are likely to regularly reside in a common location;
   determining a goal for the group of people for reducing phase differences in circadian cycles of people in the group of people;
   determining a time and lighting adjustment for altering ambient light at the common location to achieve the determined goal; and
   generating control signals to cause ambient lighting appliances at the common location to alter their performance according to the determined time to achieve the determined goal.

18. The computer-implemented method of claim 17, wherein the ambient lighting appliance are altered in performance by creating pulses of increased lighting at particular times of the day.

19. The computer-implemented method of claim 17, further comprising determining which ones of the people in the group of people are present at the common location in association with generating the control signals.

20. The computer-implemented method of claim 17, further comprising determining subsequent sleep/wake times for each of the people in the group of people, and providing subsequent signals to alter performance of the ambient lighting appliances as a function of the sleep/wake times and further to achieve the determined goal.

* * * * *